(12) United States Patent
Yan et al.

(10) Patent No.: US 12,537,947 B2
(45) Date of Patent: Jan. 27, 2026

(54) SIDE WINDOW BILATERAL FILTERING FOR VIDEO CODING

(71) Applicant: BEIJING DAJIA INTERNET INFORMATION TECHNOLOGY CO., LTD., Beijing (CN)

(72) Inventors: Ning Yan, Beijing (CN); Xiaoyu Xiu, San Diego, CA (US); Che-Wei Kuo, Beijing (CN); Wei Chen, Beijing (CN); Yi-Wen Chen, San Diego, CA (US); Hong-Jheng Jhu, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 47 days.

(21) Appl. No.: 18/394,691

(22) Filed: Dec. 22, 2023

(65) Prior Publication Data

US 2024/0155120 A1    May 9, 2024

Related U.S. Application Data

(63) Continuation of application No. PCT/US2022/034255, filed on Jun. 21, 2022.
(Continued)

(51) Int. Cl.
*H04N 19/117* (2014.01)
*H04N 19/182* (2014.01)
(Continued)

(52) U.S. Cl.
CPC ......... *H04N 19/117* (2014.11); *H04N 19/182* (2014.11); *H04N 19/46* (2014.11); *H04N 19/82* (2014.11)

(58) Field of Classification Search
CPC .. H04N 19/117; H04N 19/119; H04N 19/129; H04N 19/172; H04N 19/182; H04N 19/46; H04N 19/82
See application file for complete search history.

(56) References Cited

U.S. PATENT DOCUMENTS

| 2008/0123979 A1* | 5/2008 | Schoner | ................ | H04N 19/80 |
| | | | | 382/242 |
| 2012/0183078 A1 | 7/2012 | Lai et al. | | |

(Continued)

FOREIGN PATENT DOCUMENTS

| CN | 113761249 A | * 12/2021 | ............. G06F 16/55 |
| EP | 3720129 A1 | 10/2020 | |

(Continued)

OTHER PUBLICATIONS

International Search Report in related PCT Application No. PCT/US2022/034255, dated Sep. 30, 2022.
(Continued)

*Primary Examiner* — Md N Haque
(74) *Attorney, Agent, or Firm* — Bayes PLLC

(57) ABSTRACT

Implementations of the disclosure provide video processing systems and methods. The video processing method may include receiving, by one or more processors, a video frame of a video for in-loop filtering. For a target pixel of the video frame, the video processing method may further include selecting, by the one or more processors, a bilateral filtering window to perform the in-loop filtering on the target pixel from a group of candidate filtering windows. The group of candidate filtering windows include a plurality of side filtering windows and a full filtering window. The video processing method may also include filtering, by the one or more processors, the target pixel of the video frame using the selected bilateral filtering window.

16 Claims, 16 Drawing Sheets

Related U.S. Application Data

(60) Provisional application No. 63/213,268, filed on Jun. 22, 2021.

(51) Int. Cl.
  H04N 19/46 (2014.01)
  H04N 19/82 (2014.01)

(56) References Cited

U.S. PATENT DOCUMENTS

| | | | |
|---|---|---|---|
| 2015/0055702 | A1 | 2/2015 | Heo et al. |
| 2017/0221183 | A1* | 8/2017 | Mody .................. G06T 5/20 |
| 2018/0165796 | A1* | 6/2018 | Lai .................. H04N 13/128 |
| 2018/0220130 | A1 | 8/2018 | Zhang et al. |
| 2018/0324417 | A1 | 11/2018 | Karczewicz et al. |
| 2019/0082176 | A1 | 3/2019 | Zhang et al. |

FOREIGN PATENT DOCUMENTS

| | | | |
|---|---|---|---|
| JP | 2014534744 | A | 12/2014 |
| JP | 2016146655 | A | 8/2016 |
| JP | 2019071632 | A | 5/2019 |
| WO | 2009110559 | A | 9/2009 |
| WO | 2020200277 | A1 | 10/2020 |

OTHER PUBLICATIONS

Jianle Chen et al., Algorithm Description for Versatile Video Coding and Test Model 11 (VTM 11), [Document JVET-T2002-v2 (version 5)], Joint Video Experts Team (JVET) of ITU-T SG 16 WP 3 and ISO/IEC JTC 1/SC 29, Jan. 2021 (101 pages).

Extended European Search Report in related European Application No. 22829111.8 dated Apr. 4, 2025 (9 pages).

Naccari M et al: "Adaptive bilateral filter for improved in-loop filtering in the emerging high efficiency video coding standard", 2012 Picture Coding Symposium (PCS 2012) : Krakow, Poland, May 7-9, 2012 ; [Proceedings], IEEE, Piscataway, NJ, May 7, 2012 (May 7, 2012), pp. 397-400, XP032449912, DOI: 10.1109/PCS.2012.6213373 ISBN: 978-1-4577-2047-5.

Yin Hui et al: "Side Window Filtering", 2019 IEEE/CVF Conference on Computer Vision and Pattern Recognition (CVPR), IEEE, Jun. 15, 2019 (Jun. 15, 2019), pp. 8750-8758, XP033686989, DOI: 10.1109/CVPR.2019.00896 [retrieved on Jan. 8, 2020].

Jingsong Zhao et al: "An Improved Adaptive Support-Weight Method for Stereo Correspondence", 2015 Seventh International Conference on Measuring Technology and Mechatronics Automation, IEEE, Jun. 13, 2015 (Jun. 13, 2015), pp. 106-108, XP033204319, DOI: 10.1109/ICMTMA.2015.32 [retrieved on Sep. 11, 2015].

Notice of Reason for Refusal in related Japanese Application No. 2023-579005 dated Aug. 12, 2025 (6 pgs.).

* cited by examiner

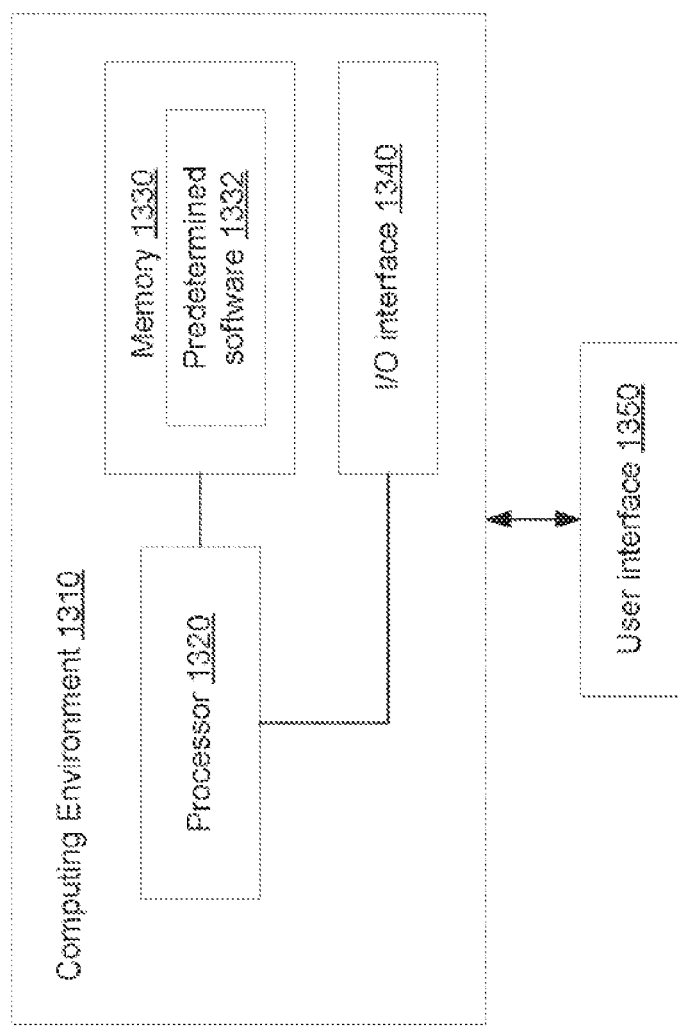

SIDE WINDOW BILATERAL FILTERING FOR VIDEO CODING

CROSS-REFERENCE TO RELATED APPLICATION

This application is continuation of International Application No. PCT/US2022/034255, filed on Jun. 21, 2022, which is based upon and claims priority to U.S. Provisional Application No. 63/213,268, filed Jun. 22, 2021, both of which are incorporated herein by reference in their entireties.

TECHNICAL FIELD

This application is related to video coding and compression. More specifically, this application relates to video processing systems and methods for bilateral filtering with side window in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video processing method for bilateral filtering with side window. The video processing method may include receiving, by one or more processors, a video frame of a video for in-loop filtering. For a target pixel of the video frame, the video processing method may include selecting, by the one or more processors, a bilateral filtering window to perform the in-loop filtering on the target pixel from a group of candidate filtering windows including a plurality of side filtering windows and a full filtering window. The video processing method may further include filtering, by the one or more processors, the target pixel of the video frame using the selected bilateral filtering window.

Implementations of the present disclosure also provide a video processing apparatus for bilateral filtering with side window. The video processing apparatus may include a memory and one or more processors. The memory may be configured to store instructions executable by the one or more processors. The one or more processors, upon execution of the instructions, are configured to perform a video processing method. The video processing method may include receiving, by the one or more processors, a video frame of a video for in-loop filtering. For a target pixel of the video frame, the video processing method may include selecting, by the one or more processors, a bilateral filtering window to perform the in-loop filtering on the target pixel from a group of candidate filtering windows including a plurality of side filtering windows and a full filtering window. The video processing method may further include filtering, by the one or more processors, the target pixel of the video frame using the selected bilateral filtering window.

Implementations of the present disclosure also provide a non-transitory computer-readable storage medium storing a bitstream to be decoded by a video processing method or a bitstream generated by the video processing method. The video processing method may include receiving a video frame of a video for in-loop filtering. For a target pixel of the video frame, the video processing method may further include selecting a bilateral filtering window to perform the in-loop filtering on the target pixel from a group of candidate filtering windows including a plurality of side filtering windows and a full filtering window. The video processing method may further include filtering the target pixel of the video frame using the selected bilateral filtering window.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 13 is a block diagram illustrating a computing environment coupled with a user interface in accordance with some implementations of the present disclosure.

DETAILED DESCRIPTION

Figure 1:
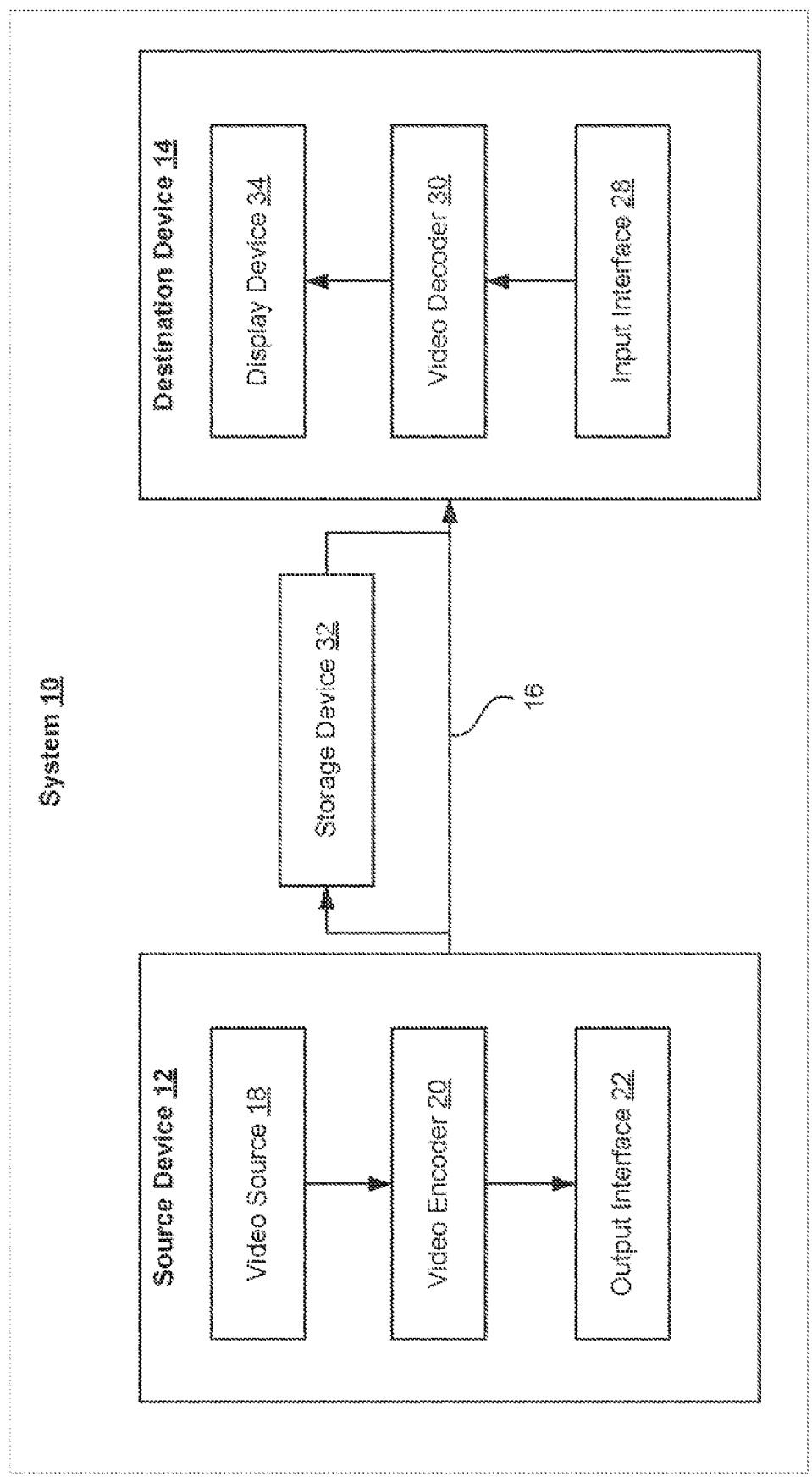
FIG. 1 is a block diagram illustrating an exemplary system for encoding and decoding video blocks in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

In the current VVC standard and the third-generation audio video coding standard (AVS3), one or more in-loop filtering modules may be present, including a de-blocking filter (DBF), a sample adaptive offset (SAO) filter, and an adaptive loop filter (ALF). During the development of the VVC standard, a bilateral filter is initially proposed to refine a reconstructed block after an inverse transform. Later, the application of the bilateral filter is extended to be a part of the in-loop filtering, which can be utilized with SAO jointly. For example, an output of the joint bilateral filter and SAO filter can be expressed using the following expression:

$$I_{OUT}=\text{clip3}(I_C+\Delta I_{BIF}+\Delta I_{SAO}) \quad (1).$$

In the above expression (1), $I_{OUT}$ denotes the output of the joint bilateral filter and SAO filter. $I_C$ denotes an intensity of a center sample. $\Delta I_{BIF}$ denotes a difference value produced by the bilateral filter using samples coming from the deblocking filter as input. $\Delta I_{SAO}$ denotes an offset value produced by the SAO filter using the samples coming from the deblocking filter as input. clip3(•) denotes a clipping function to make sure that the output is in the range of [minValue, maxValue], which is defined as follows:

$$\text{clip3}(x)=\min(\max(\text{minValue},x),\text{maxValue}) \quad (2).$$

In the Exploration Experiment (EE) 2 on enhanced compression beyond VVC capability, the bilateral filter is considered to be one of the promising tools for further compression performance improvement. In some exemplary applications, a pixel to be filtered by the bilateral filter is located at the center of a filtering window, and this kind of filtering operations may result in smoothness on edges which are expected to preserve sharpness during filtering. To avoid the undesirable smoothness on the edges, a side window filtering technique can be used to filter out noise while preserve the sharpness on the edges or other types of desirable signals.

Consistent with the present disclosure, side window filtering techniques are applied in video coding to improve the coding efficiency. To achieve the goal of the bilateral filter in video coding to make the filtered image to be close to an original image as much as possible, side window selection is carefully considered. Consistent with the present disclosure, the coding strategy for side window filtering can be adaptively adjusted for better compression performance. For example, the quality and statistic property of video blocks in a video frame may vary from block to block, and a block adaptive mechanism for side window filtering may need to be used to improve the compression performance of the video.

Consistent with the present disclosure, a video processing system and method are disclosed herein to improve coding efficiency of bilateral filtering. For example, the system and method disclosed herein can incorporate a side window filtering mechanism into bilateral filtering, such that a side window based bilateral filtering (SWBIF) process can be applied to improve the coding efficiency of the bilateral filtering.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
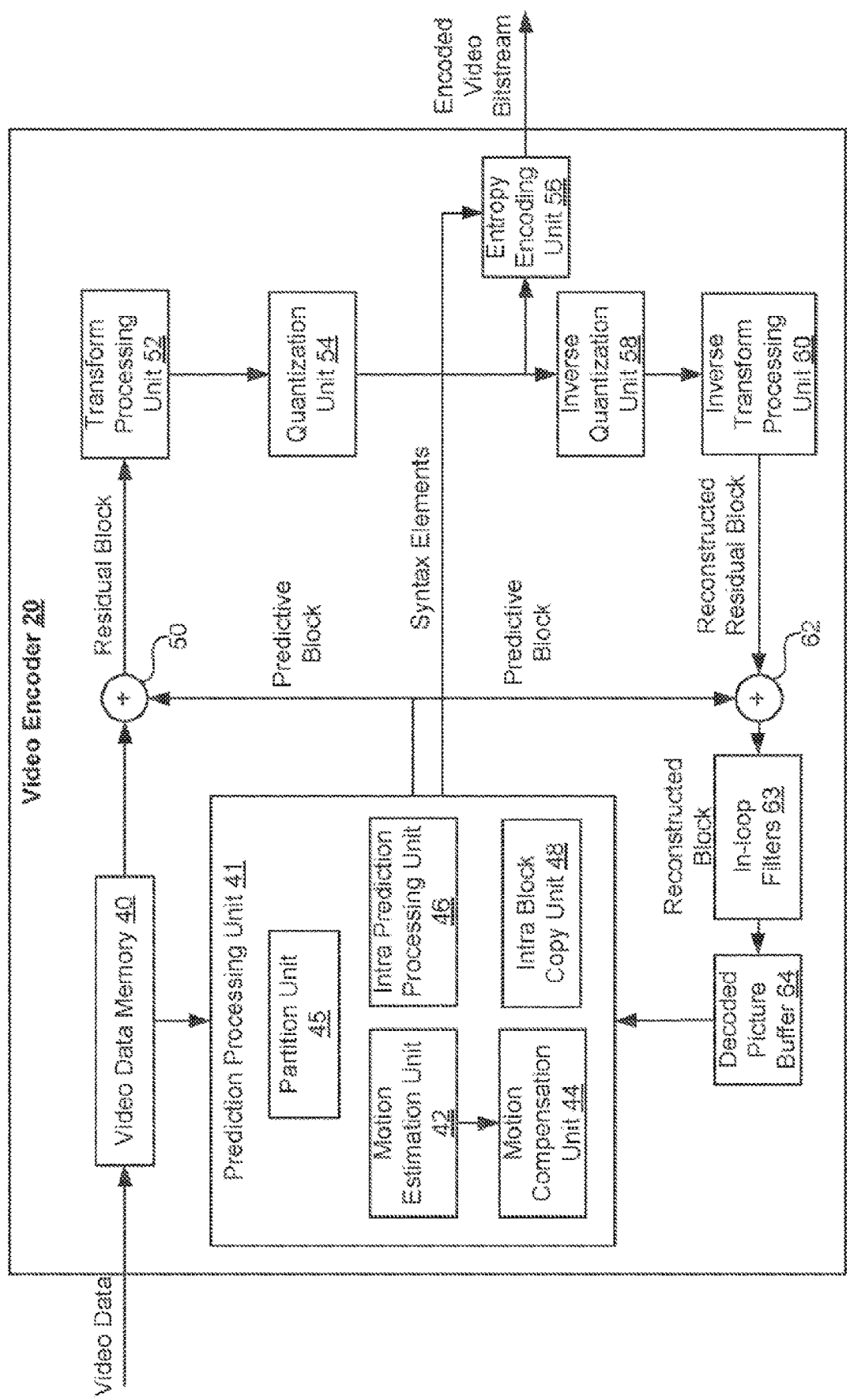
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
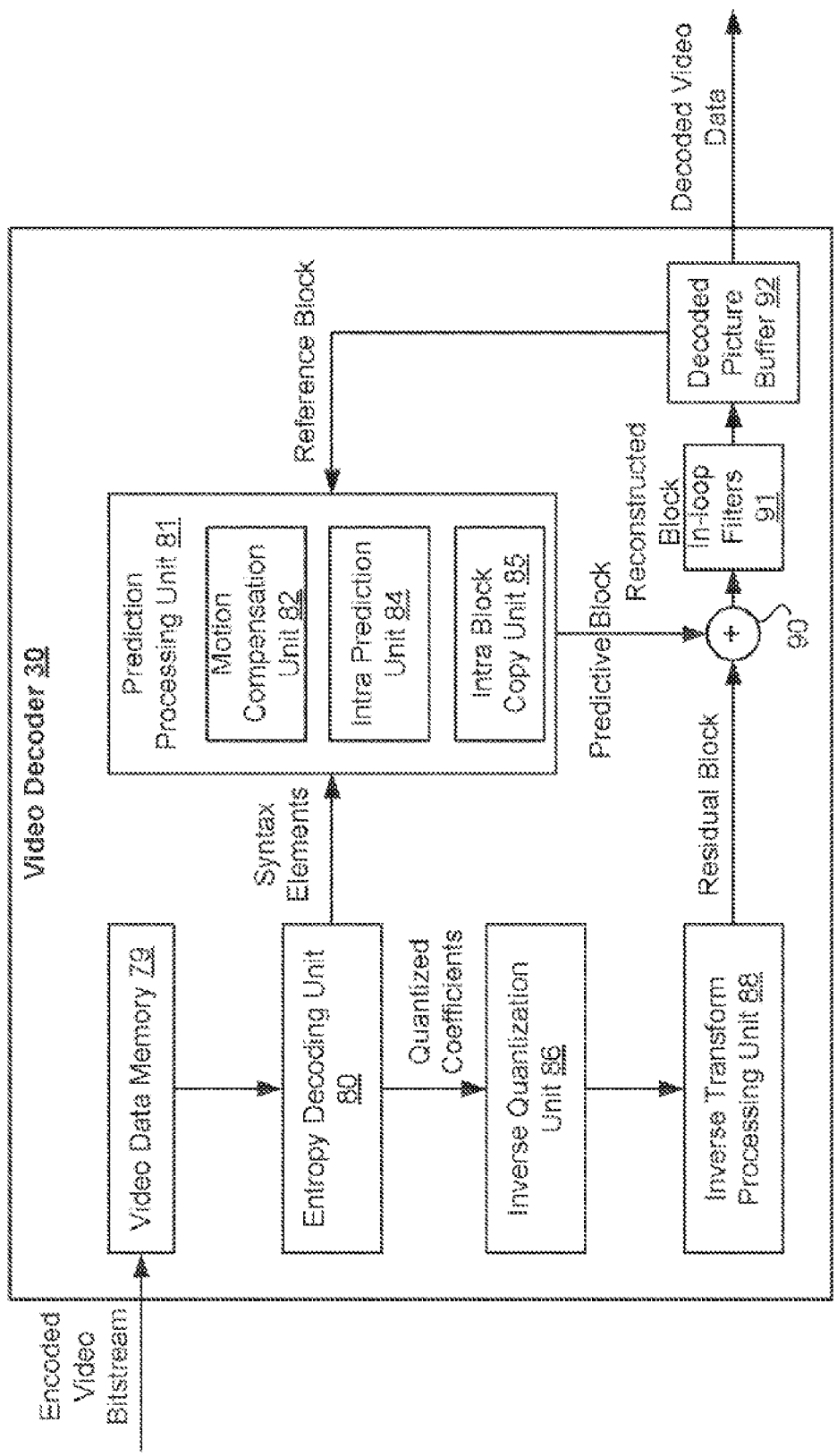
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
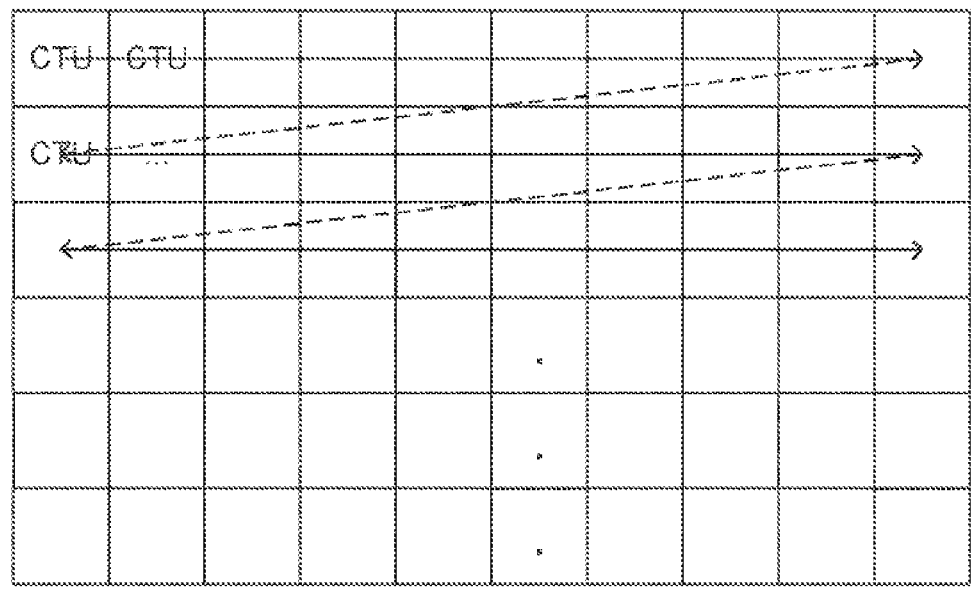
FIGS. 4A through 4E are graphical representations illustrating how a frame is recursively partitioned into multiple video blocks of different sizes and shapes in accordance with some implementations of the present disclosure.
Figure 4B:
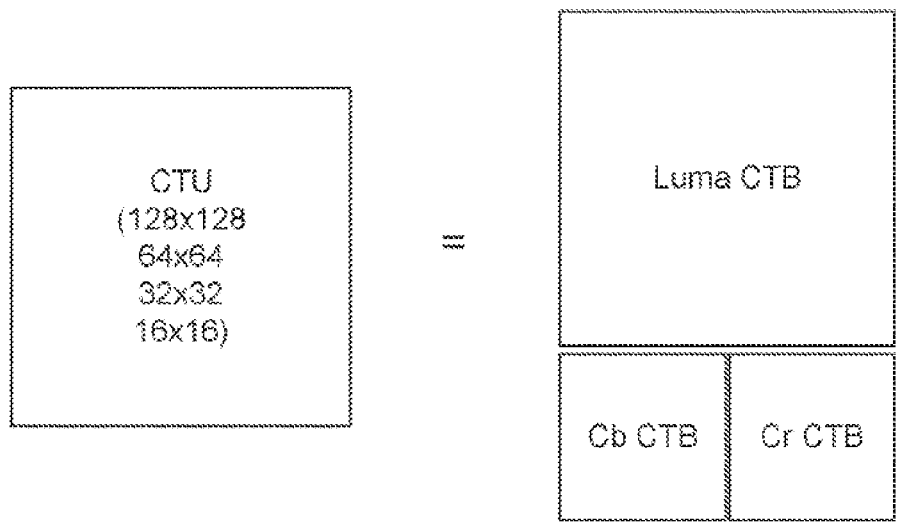

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
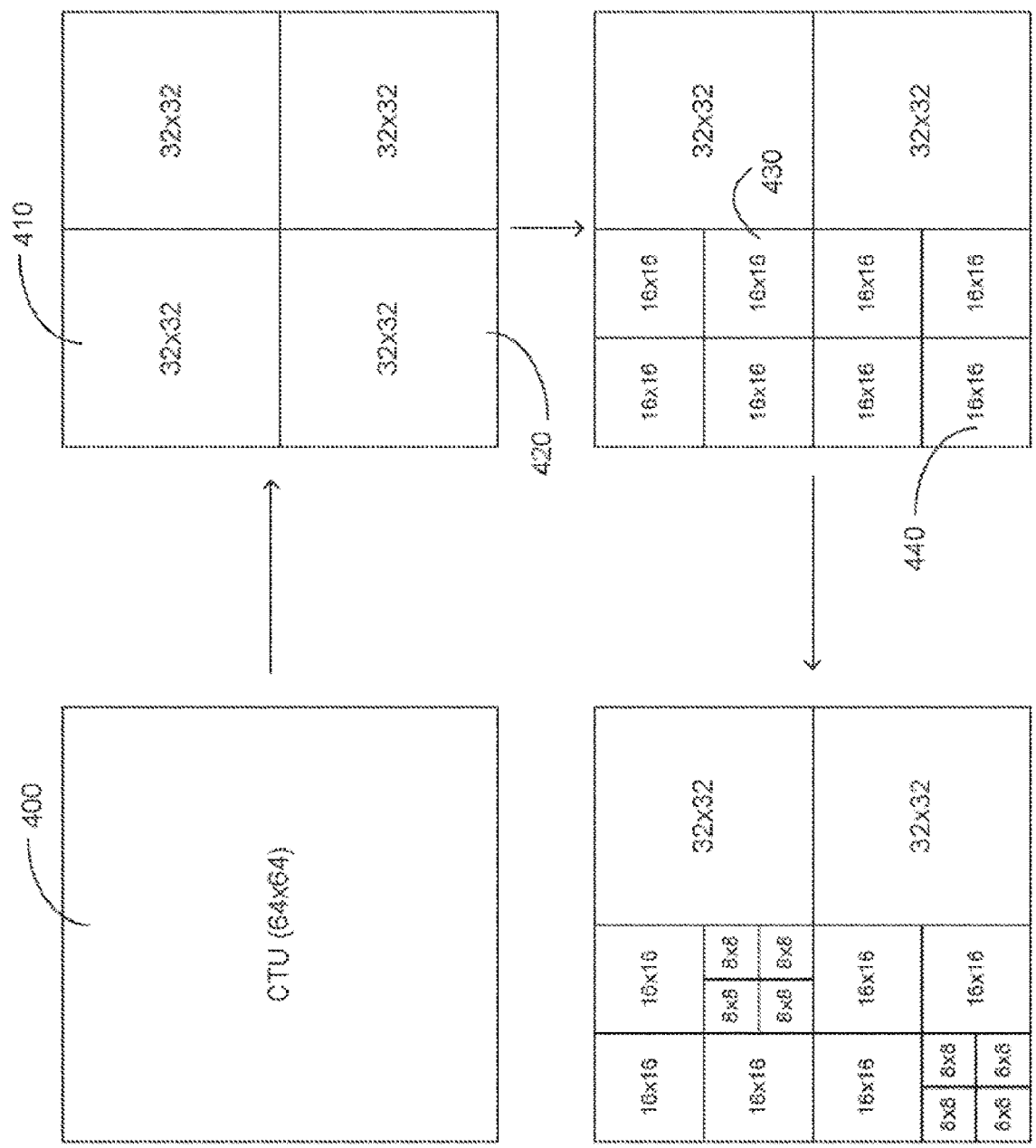
Figure 4D:
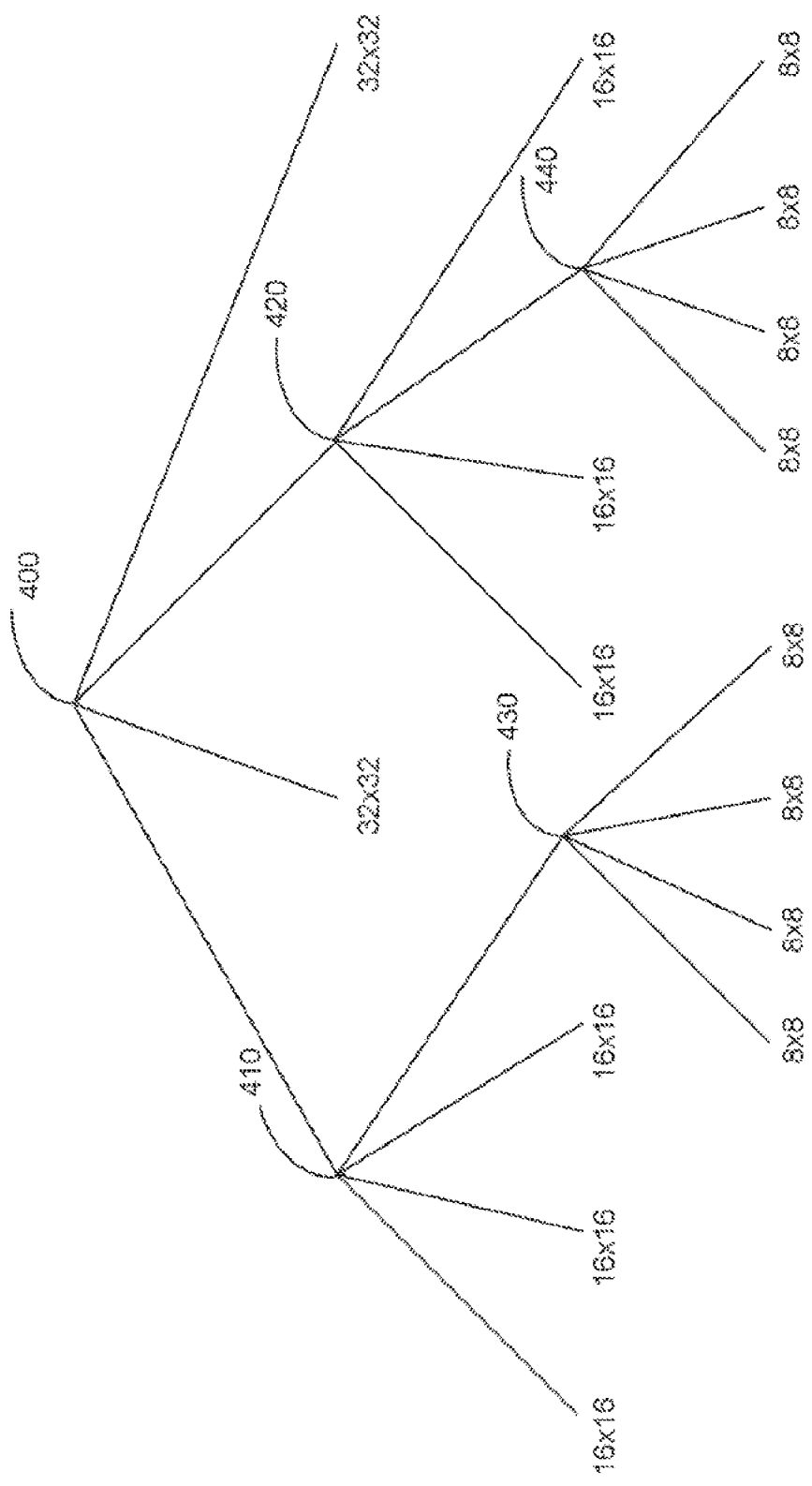
Figure 4E:
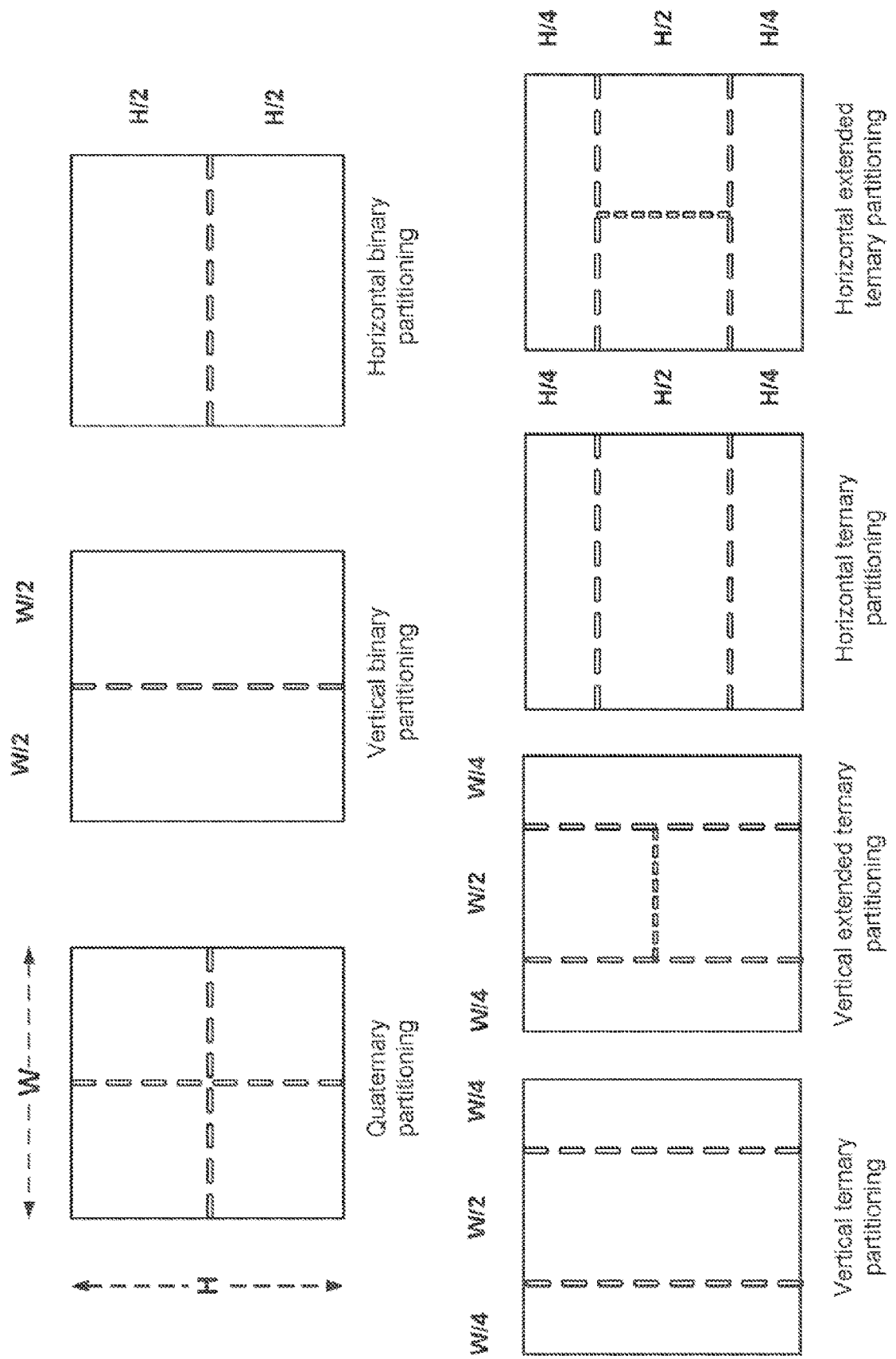

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

A brief discussion with respect to bilateral filtering is provided herein. For a filter kernel of the bilateral filtering, the contribution of each sample within a filtering window depends not only on a spatial distance between the samples, but also on the difference in intensity between the samples. For example, a sample located at a position (i,j) can be filtered using its neighboring sample at a position (k,l). A weight $\omega(i,j,k,l)$ assigned to the sample (k,l) with respect to the filtering of the sample (i,j) can be expressed in the following expression:

$$\omega(i, j, k, l) = e^{-\frac{(i-k)^2+(j-l)^2}{2\sigma_d^2} - \frac{(I(i,j)-I(k,l))^2}{2\sigma_r^2}} \qquad (3)$$

In the above expression (3), $I(i,j)$ and $I(k,l)$ denote intensity values of the samples (i,j) and (k,l), respectively. $\sigma_d$ denotes a spatial strength parameter. $\sigma_r$ denotes an intensity strength parameter. The strength of the bilateral filter is controlled by $\sigma_d$ and $\sigma_r$. An output sample of the bilateral filter for the position (i,j) can be a weighted average of the samples inside the filtering window. For example, $$S_{out(i,j)} = \frac{1}{KL} \sum_{k=1}^{K} \sum_{l=1}^{L} \omega(i, j, k, l) S(k, l). \quad (4)$$

In the above expression (4), $S_{out(i,j)}$ denotes the output sample at the position (i,j). S(k,l) denotes the sample at the position (k,l) within the filtering window, with 1≤k≤K and 1≤l≤L (e.g., S(k,l) with 1≤k≤K and 1≤l≤L denotes the pixels within the filtering window). ω(i,j,k,l) denotes a weight for S(k,l). The product KL denotes a total number of samples within the filtering window.

In some implementations, a picture parameter set Raw Byte Sequence Payload (RBSP) syntax, a slice header syntax, and a coding tree unit syntax for the bilateral filter can be implemented using the following Table 1, Table 2, and Table 3, respectively.

TABLE 1

Picture parameter set RBSP syntax for bilateral filter

| | Descriptor |
|---|---|
| pic_parameter_set_rbsp( ) { | |
| ... | |
| pps_bilateral_filter_enabled_flag | u(1) |
| if( pps_bilateral_filter_enabled_flag) { | |
| bilateral_filter_strength | u(2) |
| bilateral_filter_qp_offset | se(v) |
| } | |

TABLE 2

Slice header syntax for bilateral filter

| | Descriptor |
|---|---|
| slice_header( ) { | |
| ... | |
| if( pps_bilateral_filter_enabled_flag ) { | |
| slice_bilateral_filter_all_ctb_enabled_flag | u(1) |
| if( !slice bilateral filter all ctb_enabled_flag ) | |
| slice_bilateral_filter_enabled_flag | u(1) |
| } | |

TABLE 3

Coding tree unit syntax for bilateral filter

| | Descriptor |
|---|---|
| coding_tree_unit( ) { | |
| ... | |
| if( !slice_bilateral_filter_all_ctb_enabled_flag && slice_bilateral_filter_enabled_flag ) | |
| bilateral_filter_ctb_flag[ xCtb >> CtbLog2SizeY ][ yCtb >> CtbLog2SizeY ] | u(1) |

Figure 5:
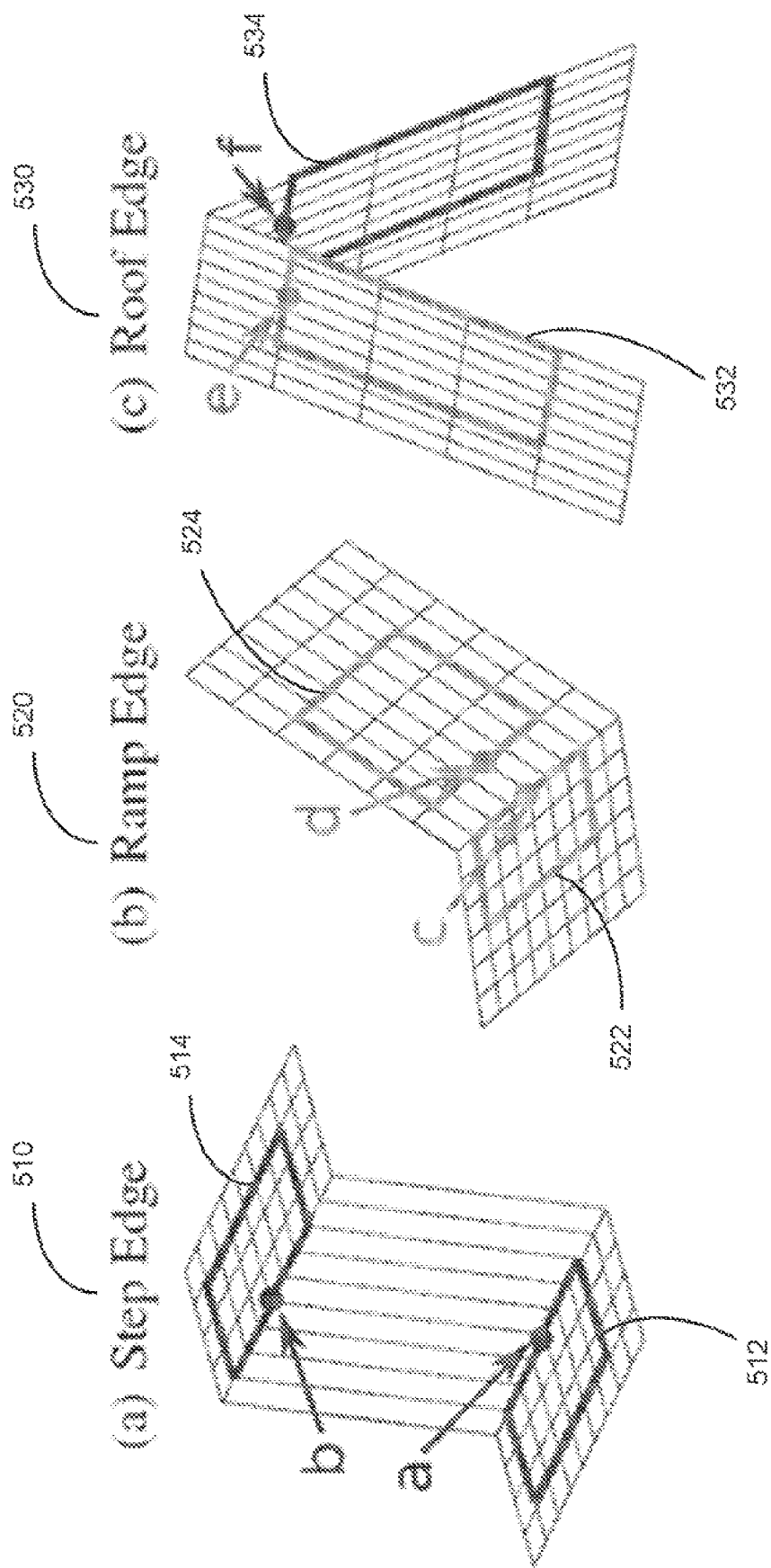
FIG. 5 is an illustration of representative edge types in video frames.
Figure 6:
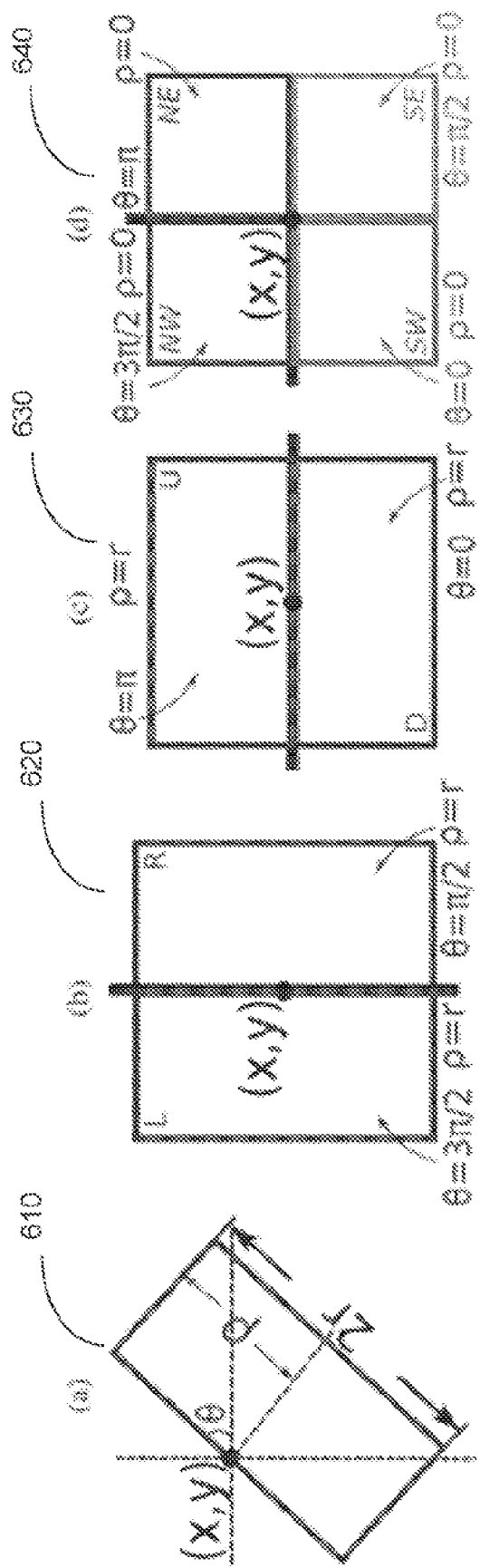
FIG. 6 is a graphical representation illustrating representative side filtering windows in accordance with some implementations of the present disclosure.

A brief discussion of side window filtering (SWF) is also provided herein with reference to FIGS. 5 and 6, where FIG. 5 illustrates representative edge types in video frames, and FIG. 6 illustrates representative side filtering windows in accordance with some implementations of the present disclosure. For image filtering, it is desirable to smooth out noise while preserving edges and other signal details in an image. In some application scenarios, image filtering methods may be based on linear approximation, which assumes that the image is piecewise linear. Then, a pixel to be filtered is in the center of a local filtering window, and a corresponding filtered pixel can be calculated as a weighted average of neighboring pixels associated with the pixel to be filtered over the local filtering window. For some edges, e.g., a step edge, a ramp edge, or a roof edge (as depicted in FIG. 5), a filtering window for each edge may be restricted to one side of the respective edge, so that sharpness on the edge can be preserved after filtering.

For example, for a pixel "a" on a step edge 510 as shown in FIG. 5, a side filtering window 512 can be restricted to the left-hand side of the pixel "a" and used to filter the pixel "a." For a pixel "b" on step edge 510, a side filtering window 514 can be restricted to the right-hand side of the pixel "b" and used to filter the pixel "b." Similarly, for a pixel "c" on a ramp edge 520, a side filtering window 522 restricted to one side of the pixel "c" can be used to filter the pixel "c." For a pixel "d" on ramp edge 520, a side filtering window 524 restricted to one side of the pixel "d" can be used to filter the pixel "d." Also, for a pixel "e" on a roof edge 530, a side filtering window 532 restricted to one side of the pixel "e" can be used to filter the pixel "e." For a pixel "f" on roof edge 530, a side filtering window 534 restricted to one side of the pixel "f" can be used to filter the pixel "f."

FIG. 6 illustrates various side filtering windows, in accordance with some implementations of the present disclosure. For example, section (a) of FIG. 6 illustrates a continuous side filtering window 610, which can be described with three parameters: (r,θ,ρ). r denotes a radius of the side filtering window, θ denotes an angle between the window and a horizontal line, and ρ denotes a position of a target pixel (x, y). A fixed-pattern side filtering window can be a special case of a continuous filtering window.

In practice, at least eight fixed-pattern side filtering windows can be used to simplify the filtering calculation, as illustrated in sections (b)-(d) of FIG. 6. For example, section (b) of FIG. 6 shows a left side filtering window (L) and a right side filtering window (R) of the target pixel (x, y). Section (c) of FIG. 6 shows an upper side filtering window (U) and a lower side filtering window (D) of the target pixel (x, y). Section (d) of FIG. 6 shows a northeast filtering window (NE), a southeast filtering window (SE), a southwest filtering window (SW), and a northwest filtering window (NW) of the target pixel (x, y), respectively.

For each pixel on an edge, eight possible filtered outputs can be obtained when applying a filter kernel using the eight side filtering windows as shown in sections (b)-(d) of FIG. 6, respectively. One of the eight possible filtered outputs (correspondingly, one of the eight side filtering windows) can be selected as an output filtered pixel to minimize a distance between the input original pixel and the output filtered pixel at the edge, thus preserving sharpness on the edge. That is, the output filtered pixel can be the same as or as close to the input original pixel as possible at the edge, so that a filtered output that has the minimum distance to the input intensity can be selected as the output filtered pixel. It is contemplated that any filter kernel can be applied in the side window filtering scheme disclosed herein by adjusting a corresponding filtering window and renormalizing corresponding filter weights, and the types of the filter kernels are not limited herein.

Consistent with the present disclosure, the side window filtering scheme disclosed herein can improve the coding performance of the in-loop filtering beyond the VVC and the AVS3 standards. In some implementations, bilateral filtering can work jointly with a SAO filter to improve the coding efficiency. By way of examples, the bilateral filtering technique is used to describe the spirit of the side window filtering scheme in the present disclosure. It is contemplated that the side window filtering scheme disclosed herein can be applied to any filtering module in the modern video coding technologies, which is not limited to bilateral filtering.

Figure 7:
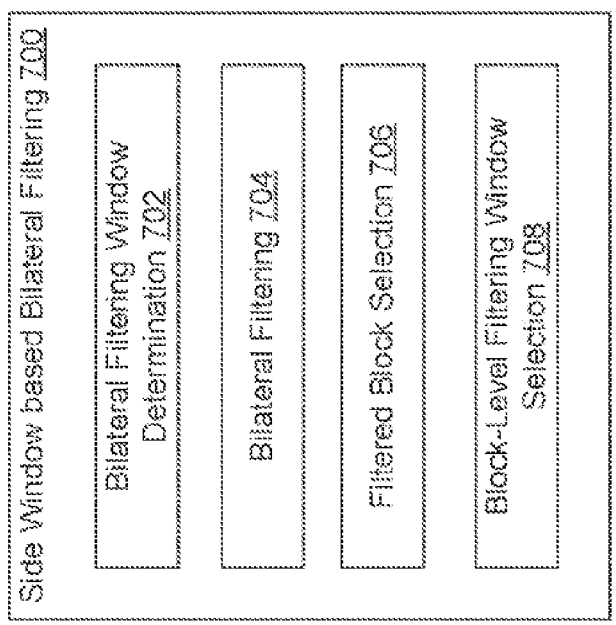
FIG. 7 is a block diagram illustrating an exemplary process for bilateral filtering with side filtering windows in accordance with some implementations of the present disclosure.

FIG. 7 is a block diagram illustrating an exemplary process for bilateral filtering with side filtering windows in accordance with some implementations of the present disclosure. In some implementations, the exemplary process of FIG. 7 can be performed by in-loop filters 63 of video encoder 20, or in-loop filters 91 of video decoder 30. In some implementations, the exemplary process of FIG. 7 may be performed by a video processor (e.g., a processor 1320 as shown in FIG. 13) at an encoder side or a decoder side. For illustration purpose only, the following description of the exemplary process of FIG. 7 is provided with respect to the video processor.

To begin with, the video processor may receive a video frame of a video for in-loop filtering. The video frame may include a plurality of video blocks, with each video block including a plurality of target pixels to be processed. For each target pixel of a video block within the video frame, the video processor may perform side window based bilateral filtering 700 on the target pixel.

For example, for each target pixel, the video processor may perform a bilateral filtering window determination operation 702 to select a bilateral filtering window for the target pixel from a group of candidate filtering windows. The group of candidate filtering windows may include a plurality of side filtering windows and a full filtering window. The plurality of side filtering windows may include, for example, an L window, a R window, a U window, a D window, an NW window, an SE window, an SW window, or an SE window of the target pixel, as shown in FIG. 6. The full filtering window can be, for example, a symmetric filtering window with the target pixel located in the middle of the window.

Subsequently, the video processor may perform a bilateral filtering operation 704 to filter the target pixel of the video block within the video frame using the selected bilateral filtering window. For example, the video processor may apply the above expression (3) to derive a filtered pixel for the target pixel based on the selected bilateral filtering window.

In the following, a plurality of exemplary implementations for side window based bilateral filtering 700 are provided herein for deriving a respective filtered pixel corresponding to each target pixel within the video frame. In the bilateral filtering disclosed herein, the filtering of each target pixel may be a process of weighting all the neighboring pixels within the bilateral filtering window. The bilateral filtering window can be the full filtering window or one of the side filtering windows disclosed herein. One or more criteria can be used to determine which filtering window is optimal for the target pixel as described below in more detail.

In a first exemplary implementation of side window based bilateral filtering 700, the video processor may filter the target pixel with a plurality of side filtering windows to obtain a plurality of filtered pixel values, respectively. For example, for each side filtering window, the video processor may apply the above expression (3) to derive a corresponding filtered pixel value for the target pixel based on the side filtering window. As a result, a plurality of filtered pixel values can be generated for the plurality of side filtering windows, respectively.

Then, the video processor may calculate a plurality of differences corresponding to the plurality of filtered pixel values, where each difference is between a corresponding filtered pixel value and the original pixel value of the target pixel. The video processor may identify, from the plurality of filtered pixel values, a filtered pixel value associated with a minimum difference among the plurality of differences as the optimal filtered pixel value. The video processor may select a side filtering window corresponding to the optimal filtered pixel value as the bilateral filtering window for the target pixel. The video processor may output a filtered pixel for the target pixel using the selected bilateral filtering window.

For example, the first exemplary implementation of side window based bilateral filtering 700 can be described as follows:

---

First Exemplary Implementation: Conduct the side window filtering for each target pixel

---

Premise: $\omega_{i,j}$ is a weight of a pixel j, which is a neighboring pixel of the target pixel i. $S = \{L, R, U, D, NW, NE, SW, SE\}$ is a group of window indices representing a group of candidate filtering windows (which are side filtering windows in this first exemplary implementation). $p_j$ and $p_i$ denote original pixel values of the pixel j and the target pixel i, respectively.

Step 1: Calculate a respective filtered pixel value $I_n$ corresponding to each side filtering window n as follows:

$$I_n = \frac{1}{N_n} \sum_{j \in \Omega_i^n} \omega_{ij} p_j, \text{ where } N_n = \sum_{j \in \Omega_i^n} \omega_{ij} \text{ and } n \in S.$$

Step 2: Find an optimal result $I_{opt}$, such that $$I_{opt} = \arg\min_{n \in S} \|p_i - I_n\|_2^2, \text{ where } \|p_i - I_n\|_2^2 \text{ denotes a difference}$$

between an original pixel value of the target pixel i and a filtered pixel value $I_n$.

Return: $I_{opt}$ as the output filtered pixel value for the target pixel, where the bilateral filtering window is selected to be a side filtering window leading to $I_{opt} = \arg\min_{n \in S} \|p_i - I_n\|_2^2$.

---

Consistent with the present disclosure, the first exemplary implementation of side window based bilateral filtering 700 follows the criterion that the optimal side filtering window may result in an output filtered pixel that is the closest to the original pixel. Only side filtering window will be selected and the full filtering window is not considered in the first exemplary implementation.

A second exemplary implementation of side window based bilateral filtering 700 can be formed by modifying the first exemplary implementation in one or more aspects. In some implementations, the first exemplary implementation can be modified to incorporate the full filtering window into the group of candidate filtering windows. That is, the group of candidate filtering windows in the second exemplary implementation can be modified to be S={F,L,R,U,D,NW,NE,SW,SE} to include the full filtering window, where F represents the full filtering window. Accordingly, a side filtering window or the full filtering window can be selected for the bilateral filtering.

In some implementations, an additional judgement condition to increase the confidence on the selection of a side filtering window can be provided in the second exemplary implementation. For example, the additional judgement condition can be added after Step 2 of the first exemplary implementation. As described below in more detail, if (a) a candidate filtering window corresponding to an optimal filtered pixel value at Step 2 of the second exemplary implementation is a side filtering window, and (b) a first difference between the original pixel value before filtering and a full-window filtered pixel value generated using the full filtering window is obviously greater than a second difference between the original pixel value and the optimal filtered pixel value generated using the side filtering window (e.g., the first difference−the second difference≥a predetermined threshold th1), then the side filtering window corresponding to the optimal filtered pixel value can be selected as the bilateral filtering window. Otherwise, the full filtering window can be selected to be the bilateral filtering window.

Specifically, similar to the first exemplary implementation, the video processor may filter the target pixel with the plurality of side filtering windows to obtain a plurality of filtered pixel values in the second exemplary implementation. For example, for each side filtering window, the video processor may apply the above expression (3) to derive a corresponding filtered pixel value for the target pixel based on the side filtering window. As a result, a plurality of filtered pixel values can be generated for the plurality of side filtering windows, respectively.

Then, the video processor may calculate a plurality of differences corresponding to the plurality of filtered pixel values, where each difference is between a corresponding filtered pixel value and the original pixel value of the target pixel. The video processor may identify, from the plurality of filtered pixel values, a filtered pixel value corresponding to a minimum difference among the plurality of differences as the optimal filtered pixel value.

The video processor may also filter the target pixel with the full filtering window to obtain a full-window filtered pixel value. The video processor may calculate a first difference between the full-window filtered pixel value and the original pixel value of the target pixel. The video processor may also calculate a second difference between the optimal filtered pixel value and the original pixel value of the target pixel. The video processor may determine whether the first difference and the second difference satisfy a predetermined condition. In some implementations, the predetermined condition may indicate that a third difference between the first difference and the second difference is below a predetermined threshold th1. For example, if the third difference is below the predetermined threshold th1, the predetermined condition is satisfied (e.g., the third difference=the first difference−the second difference, the third difference<the predetermined threshold th1).

When the first difference and the second difference satisfy the predetermined condition, the video processor may select the full filtering window as the bilateral filtering window. Otherwise, the video processor may select a side filtering window corresponding to the optimal filtered pixel value as the bilateral filtering window for the target pixel. The video processor may output a filtered pixel for the target pixel using the selected bilateral filtering window.

For example, the second exemplary implementation can be described as follows:

---

Second Exemplary Implementation: Conduct the side window filtering for each target pixel Premise: $\omega_{ij}$ is a weight of a pixel j, which is a neighboring pixel of the target pixel i. S = {F, L, R, U, D, NW, NE, SW, SE} is a group of window indices representing a group of candidate filtering windows (including side filtering windows and a full filtering window). $p_j$ and $p_i$ denote original pixel values of the pixel j and the target pixel i, respectively.
Step 1: Calculate a respective filtered pixel value $I_n$ corresponding to each candidate filtering window n as follows:

$$I_n = \frac{1}{N_n} \sum_{j \in \Omega_i^n} \omega_{ij} p_j, \text{ where } N_n = \sum_{j \in \Omega_i^n} \omega_{ij}, \text{ and } n \in S.$$

Step 2: Find an optimal result $I_{opt}$, such that $$I_{opt} = \arg\min_{n \in S} \|p_i - I_n\|_2^2, \text{ where } \|p_i - I_n\|_2^2 \text{ denotes a difference}$$

between an original pixel value of the target pixel i and a filtered pixel value $I_n$. Obtain a filtering window m corresponding to $I_{opt}$ (e.g., the filtering window m is a candidate filtering window leading to $$I_{opt} = \arg\min_{n \in S} \|p_i - I_n\|_2^2 \Big).$$

Step 3: If m is a side filtering window and $\|p_i - I_F\|_2^2 - \|p_i - I_{opt}\|_2^2 < th1$, then $I_{opt} = I_F$, where $I_F$ represents a full-window filtered pixel value, $\|p_i - I_F\|_2^2$ denotes a first difference between the original pixel value of the target pixel i and the full-window filtered pixel value, and $\|p_i - I_{opt}\|_2^2$ denotes a second difference between the original pixel value of the target pixel i and the optimal filtered pixel value.
Return: $I_{opt}$ as the output filtered pixel for the target pixel. That is, if $\|p_i - I_F\|_2^2 - \|p_i - I_{opt}\|_2^2 \geq th1$, the bilateral filtering window is the side filtering window m leading to $$I_{opt} = \arg\min_{n \in S} \|p_i - I_n\|_2^2. \text{ Otherwise, the bilateral filtering window is}$$

the full filtering window.

---

A third exemplary implementation of side window based bilateral filtering 700 may include determining a bilateral filtering window for each target pixel based on an optimal pixel similarity value. For example, as described below in more detail, an average difference between the target pixel and pixels within the bilateral filtering window may be the smallest among a group of average differences associated with the group of candidate filtering windows.

Specifically, the video processor may determine a group of pixel similarity values for the group of candidate filtering windows, respectively. For example, a pixel similarity value for each candidate filtering window is between the target pixel and neighboring pixels of the target pixel that fall within the candidate filtering window. The pixel similarity value for each candidate filtering window can be an average of differences determined between an original pixel value of the target pixel and original pixel values of its neighboring pixels that fall within the candidate filtering window. As a result, a group of averages of differences are determined for the group of candidate filtering windows, respectively, and used as the group of pixel similarity values. The video processor may determine an optimal pixel similarity value among the group of pixel similarity values. For example, the video processor may determine the optimal pixel similarity value as a minimal average of differences among the group of averages of differences.

The video processor may select, from the group of candidate filtering windows, a candidate filtering window corresponding to the optimal pixel similarity value as the bilateral filtering window. Specifically, if the candidate filtering window corresponding to the optimal pixel similarity value is a side filtering window, the video processor may select the bilateral filtering window based on a comparison of the optimal pixel similarity value with a pixel similarity value determined for the full filtering window. For example, when a difference between the pixel similarity value for the full filtering window and the optimal pixel similarity value is under a predetermined threshold th2, the video processor may select the full filtering window as the bilateral filtering window. However, if the difference between the pixel similarity value for the full filtering window and the optimal pixel similarity value is greater than or equal to the predetermined threshold th2, the video processor may select the side filtering window corresponding to the optimal pixel similarity value as the bilateral filtering window.

For example, the third exemplary implementation can be described as follows:

---

Third Exemplary Implementation: Conduct the side window filtering for each target pixel

---

Premise: $\omega_{i,j}$ is a weight of a pixel j, which is a neighboring pixel of the target pixel i. S = {F, L, R, U, D, NW, NE, SW, SE} is a group of window indices representing a group of candidate filtering windows (including side filtering windows and a full filtering window). $p_j$ and $p_i$ denote original pixel values of the pixel j and the target pixel i, respectively.

Step 1: Calculate a respective pixel similarity value $d_n$ corresponding to each candidate filtering window n as follows:

$d_n = \frac{1}{N_n} \sum_{j \in \Omega_i^n} \|p_i - p_j\|_2^2$, where $N_n = NumPixel(\Omega_i^n)$, $n \in S$, and $\frac{1}{N_n} \sum_{j \in \Omega_i^n} \|p_i - p_j\|_2^2$ also denotes an average of differences between an original pixel value of the target pixel i and original pixel values of its neighboring pixels that fall within the candidate filtering window n.

Step 2: Find a candidate filtering window $n_{opt}$ such that $n_{opt} = \arg\min_{n \in S} d_n$ and an optimal pixel similarity value $d_{n_{opt}} = \min_{n \in S} d_n$, where $\min_{n \in S} d_n$ is a minimal average of differences.

Step 3: If $n_{opt}$ is a side filtering window and $d_F - d_{n_{opt}} < th2$, then $n_{opt} = F$, where $d_F$ denotes the pixel similarity value for the full filtering window.

---

Third Exemplary Implementation: Conduct the side window filtering for each target pixel

---

Return: $n_{opt}$ as the bilateral filtering window. That is, if $d_F - d_{n_{opt}} \geq th2$, the bilateral filtering window is the side filtering window $n_{opt}$ with $n_{opt} = \arg\min_{n \in S} d_n$. Otherwise, the bilateral filtering window is the full filtering window.

---

In some application scenarios, a direct application of the side window filtering may fail in some video blocks due to the diversity and nonstationary property of the video content. For example, some video blocks may only be applied with the full window filtering, while other video blocks can be applied with the side window filtering. To provide the flexibility for applying either the full window filtering or the side window filtering at a block level, the video processor may also perform filtered block selection 706 to select a suitable output filtered block for each video block. For example, a first potential filtered block for the video block may be a full-window filtered block with all filtered pixels generated using only full filtering windows. A second potential filtered block for the video block can be a side-window filtered block with all pixels generated using side window based bilateral filtering 700 described above. It is contemplated that the second potential filtered block may also be any other suitable filtered block, which is not limited to a filtered block generated using side window based bilateral filtering 700. The output filtered block for the video block may be determined to be one of the first and second potential filtered blocks.

In some implementations, filtered block selection 706 may be conducted at different granularity levels. Each video block can be a transform unit (TU), a coding unit (CU), or a coding tree unit (CTU). The video processor may flag each video block to indicate whether the video block is full-window filtered or side-window filtered. For example, the video processor may flag each video block to indicate whether an output filtered block for the video block is a full-window filtered block or a side-window filtered block. Filtered block selection 706 is also described below in more detail with reference to FIG. 12.

For example, since bilateral filtering can be conducted at a TU level, filtered block selection 706 can be performed at the TU level. The following Table 4 provides syntax elements of filtered block selection at the TU level. An element "side_window_flag" can be signaled for each TU to indicate whether a full-window filtered block or a side-window filtered block is used as an output filtered block. For example, a first value of side_window_flag may indicate that the full-window filtered block is used as the output filtered block. A second value of side_window_flag may indicate that the side-window filtered block is used as the output filtered block. At the encoder side, a rate distortion optimization can be applied to determine whether the full-window filtered block or the side-window filtered block is used as the output filtered block.

TABLE 4

The syntax elements of filtered block selection at the TU level

| | Descriptor |
|---|---|
| transform_tree( x0, y0, tbWidth, tbHeight , treeType, chType ) { | |
|   InferTuCbfLuma = 1 | |
|   if( IntraSubPartitionsSplitType = = ISP_NO_SPLIT && !cu_sbt_flag ) { | |
|     if( tbWidth > MaxTbSizeY | | tbHeight > MaxTbSizeY ) { | |

TABLE 4-continued

The syntax elements of filtered block selection at the TU level

| | Descriptor |
|---|---|
|       verSplitFirst = ( tbWidth > MaxTbSizeY && tbWidth > tbHeight ) ? 1 : 0 | |
|       trafoWidth = verSplitFirst ? ( tbWidth / 2 ) : tbWidth | |
|       trafoHeight = !verSplitFirst ? ( tbHeight / 2) : tbHeight | |
|       transform_tree( x0, y0, trafoWidth, trafoHeight, treeType, chType ) | |
|       if( verSplitFirst ) | |
|   transform_tree( x0 + trafoWidth, y0, trafoWidth, trafoHeight, treeType, chType ) | |
|       else | |
|   transform_tree( x0, y0 + trafoHeight, trafoWidth, trafoHeight, treeType, chType ) | |
|     } else { | |
|       transform_unit( x0, y0, tbWidth, tbHeight, treeType, 0, chType ) | |
|     if(chType == CHANNEL_TYPE_LUMA && max(tbWidth, tbHeight)<128 && qp>17 &&(isIntra \|\| (isInter && tu_y_coded_flag[ x0 ][ y0 ]&& min(tbWidth, tbHeight)<32))){ | |
|       side_window_flag | u(1) |
|       } | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType , 0, 0 ) | |
|     if(chType == CHANNEL_TYPE_LUMA && max(trafoWidth, tbHeight)<128 && qp>17 &&(isIntra \|\| (isInter && tu_y_coded_flag[ x0 ][ y0 ]&& min(trafoWidth, tbHeight)<32))){ | |
|       side_window_flag | u(1) |
|       } | |
|   transform_unit( x0 + trafoWidth, y0, tbWidth − trafoWidth, tbHeight, treeType, 1, 0 ) | |
|     if(chType == CHANNEL_TYPE_LUMA && max(tbWidth − trafoWidth, tbHeight)<128 && qp>17 &&(isIntra \|\| (isInter && tu_y_coded_flag[ x0+trafoWidth ][ y0 ]&& min(tbWidth − trafoWidth, tbHeight)<32))){ | |
|       side_window_flag | u(1) |
|       } | |
|     } else { | |
|       trafoHeight = tbHeight * SbtNumFourthsTb0 / 4 | |
|       transform_unit( x0, y0, tbWidth, trafoHeight, treeType , 0, 0 ) | |
|     if(chType == CHANNEL_TYPE_LUMA && max(tbWidth, trafoHeight)<128 && qp>17 &&(isIntra \|\| (isInter && tu_y_coded_flag[ x0 ][ y0 ]&& min(tbWidth, trafoHeight)<32))){ | |
|       side_window_flag | u(1) |
|       } | |
|   transform_unit( x0, y0 + trafoHeight, tbWidth, tbHeight − trafoHeight, treeType, 1, 0 ) | |
|     if(chType == CHANNEL_TYPE_LUMA && max(tbWidth, tbHeight-trafoHeight)<128 && qp>17 &&(isIntra \|\| (isInter && tu_y_coded_flag[ x0 ][ y0+trafoHeight ]&& min(tbWidth, tbHeight-trafoHeight)<32))){ | |
|       side_window_flag | u(1) |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ){ | |
|   transform_unit( x0, y0 + trafoHeight * partIdx, tbWidth, trafoHeight, treeType, partIdx, 0 ) | |
|     if(chType == CHANNEL_TYPE_LUMA && max(tbWidth, trafoHeight)<128 && qp>17 &&(isIntra \|\| (isInter && tu_y_coded_flag[ x0 ][ y0+ trafoHeight * partIdx ]&& min(tbWidth, trafoHeight)<32))){ | |
|       side_window_flag | u(1) |
|       } | |
|     } | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ){ | |
|   transform_unit( x0 + trafoWidth * partIdx, y0, trafoWidth, tbHeight, treeType, partIdx, 0 ) | |
|     if(chType == CHANNEL_TYPE_LUMA && max(trafoWidth, tbHeight)<128 && qp>17 &&(isIntra \|\| (isInter && tu_y_coded_flag[ x0 + trafoWidth * partIdx ][ y0 ]&& min(trafoWidth, tbHeight)<32))){ | |

TABLE 4-continued

The syntax elements of filtered block selection at the TU level

| | Descriptor |
|---|---|
| side_window_flag<br>}<br>}<br>}<br>} | u(1) |

In another example, filtered block selection 706 can be performed at the CU level. The side window flag can be signaled at the CU level. The following Table 5 provides the syntax elements of filtered block selection at the CU level.

TABLE 5

The syntax elements of filtered block selection at the CU level

| | Descriptor |
|---|---|
| coding_unit( x0, y0, cbWidth, cbHeight, cqtDepth, treeType, modeType ) {<br>  if( sh_slice_type = = I && ( cbWidth > 64 | | cbHeight > 64 ) )<br>    modeType = MODE_TYPE_INTRA<br>......<br>  if( cu_coded_flag ) {<br>    if( CuPredMode[ chType ][ x0 ][ y0 ] = = MODE_INTER && sps_sbt_enabled_flag && !ciip_flag[ x0 ][ y0 ] && cbWidth <= MaxTbSizeY && cbHeight <= MaxTbSizeY ) {<br>      allowSbtVerH = cbWidth >= 8<br>      allowSbtVerQ = cbWidth >= 16<br>      allowSbtHorH = cbHeight >= 8<br>      allowSbtHorQ = cbHeight >= 16<br>      if( allowSbtVerH | | allowSbtHorH )<br>        cu_sbt_flag | |
| | ae(v) |
|       if( cu_sbt_flag ) {<br>        if( ( allowSbtVerH | | allowSbtHorH ) && ( allowSbtVerQ | | allowSbtHorQ ) )<br>          cu_sbt_quad_flag | |
| | ae(v) |
|         if( ( cu_sbt_quad_flag && allowSbtVerQ && allowSbtHorQ ) | |<br>          ( !cu_sbt_quad_flag && allowSbtVerH && allowSbtHorH ) )<br>          cu_sbt_horizontal_flag | ae(v) |
|         cu_sbt_pos_flag | ae(v) |
|       }<br>    }<br>    if( sps_act_enabled_flag && CuPredMode[ chType ][ x0 ][ y0 ] != MODE_INTRA &&<br>      treeType = = SINGLE_TREE )<br>      cu_act_enabled_flag | ae(v) |
|     LfnstDcOnly = 1<br>    LfnstZeroOutSigCoeffFlag = 1<br>    MtsDcOnly = 1<br>    MtsZeroOutSigCoeffFlag = 1<br>    transform_tree( x0, y0, cbWidth, cbHeight, treeType, chType )<br>    lfnstWidth = ( treeType = = DUAL_TREE_CHROMA )? cbWidth / SubWidthC :<br>( ( IntraSubPartitionsSplitType = = ISP_VER_SPLIT ) ? cbWidth / NumIntraSubPartitions : cbWidth )<br>    lfnstHeight = ( treeType = = DUAL_TREE_CHROMA )? cbHeight / SubHeightC :<br>( ( IntraSubPartitionsSplitType = = ISP_HOR_SPLIT)? cbHeight / NumIntraSubPartitions : cbHeight )<br>    lfnstNotTsFlag = ( treeType = = DUAL_TREE_CHROMA<br>| | !tu_y_coded_flag[ x0 ][ y0 ] | |transform_skip_flag[ x0 ][ y0 ][ 0 ] = = 0 )<br>&& ( treeType = = DUAL_TREE_LUMA | | ( ( !tu_cb_coded_flag[ x0 ][ y0 ]<br>| | transform_skip_flag[ x0 ][ y0 ][ 1 ] = = 0 ) &&<br>( !tu_cr_coded_flag[ x0 ][ y0 ] | | transform_skip_flag[ x0 ][ y0 ][ 2 ] = = 0 ) ) )<br>    if( Min( lfnstWidth, lfnstHeight ) >= 4 && sps_lfnst_enabled)flag = = 1 &&<br>      CuPredMode[ chType ][ x0 ][ y0 ] = = MODE_INTRA && lfnstNotTsFlag = = 1 &&<br>      ( treeType = = DUAL_TREE_CHROMA<br>| | !IntraMipFlag[ x0 ][ y0 ] | |<br>        Min( lfnstWidth, lfnstHeight ) >= 16 ) &&<br>      Max( cbWidth, cbHeight ) <= MaxTbSizeY) {<br>      if( ( IntraSubPartitionsSplitType != ISP_NO SPLIT | | LfnstDcOnly = = 0 ) &&<br>        LfnstZeroOutSigCoeffFlag = = 1 ) | |

TABLE 5-continued

The syntax elements of filtered block selection at the CU level

| | Descriptor |
|---|---|
|       lfnstidx<br>    }<br>    if( treeType != DUAL_TREE_CHROMA && lfnst_idx == 0 &&<br>        transform_skip_flag[ x0 ][ y0 ][ 0 ] == 0 && Max( cbWidth,<br>cbHeight ) <= 32 &&<br>        IntraSubPartitionsSplitType == ISP_NO_SPLIT && cu_sbt_flag<br>== 0 &&<br>        MtsZeroOutSigCoeffFlag == 1 && MtsDcOnly == 0 ) {<br>        if( ( ( CuPredMode[ chType ][ x0 ][ y0 ] == MODE_INTER &&<br>            sps_explicit_mts_inter_enabled_flag ) ||<br>          ( CuPredMode[ chType ][ x0 ][ y0 ] == MODE_INTRA &&<br>            sps_explicit_mts_intra_enabled_flag ) ) )<br>        mts_idx<br>    }<br>}<br>isBIFEnabled = false<br>for(tuIdx=0; tuIdx<NumTUInCU;tuIdx++){<br>  if(bilateral_filter_ctb_flag[ x0 >> CtbLog2SizeY ][ y0 >> CtbLog2SizeY ]<br>&& max(tbWidth, tbHeight)<128 && qp>17 &&(isIntra || (isInter &&<br>tu_y_coded_flag&& min(tbWidth, tbHeight)<32)) ){<br>    isBIFEnabled = true<br>    break<br>  }<br>}<br>  if(isBIFEnabled && chType == CHANNEL_TYPE_LUMA &&<br>bilateral_filter_ctb_flag[ x0 >> CtbLog2SizeY ][ y0 >> CtbLog2SizeY ]){<br>    Side_window_flag<br>  }<br>} | ae(v)<br><br><br><br><br><br><br><br><br><br>ae(v)<br><br><br><br><br><br><br><br><br><br><br><br>u(1) |

In yet another example, since the filtered block selection at the TU or CU level may cause overhead, filtered block selection 706 can be performed at the CTU level to avoid the overhead. The following Table 6 provides the syntax elements of filtered block selection at the CTU level. If bilateral_filter_ctb_flag is true, then side_window_flag is signalled to indicate whether the side-window filtered block is used.

TABLE 6

The syntax elements of filtered block selection at the CTU level

| | Descriptor |
|---|---|
| coding_tree_unit( ) {<br>...<br>  if( !slice_bilateral_filter_all_ctb_enabled_flag &&<br>slice_bilateral_filter_enabled_flag )<br>    bilateral_filter_ctb_flag[ xCtb >> CtbLog2SizeY ][ yCtb >> CtbLog2SizeY<br>]<br>  if(bilateral_filter_ctb_flag[ xCtb >> CtbLog2SizeY ][ yCtb >> CtbLog2Size<br>Y ]){<br>    side_window_flag<br>  } | <br><br><br><br>u(1)<br><br><br><br>u(1) |

In some implementations, the video processor may also perform block-level filtering window selection 708. For example, the video processor may adaptively select a bilateral filtering window for each video block. For example, at the encoder side, the video processor may determine that each pixel in the video block can be filtered using a full filtering window. Alternatively, the video processor may determine that each pixel in the video block can be filtered using a particular side filtering window. A filter window index can be signaled to indicate which filtering window is used for the video block. At the decoder side, the filtering window index can be parsed, and then bilateral filtering can be conducted with a filtering window signaled by the filtering window index.

Consistent with the present disclosure, block-level filtering window selection 708 can also be conducted at different granularity levels. The following Table 7 provides the syntax elements of filtering window selection at the TU level. For each TU, a filter_window_index can be signaled to indicate a filtering window used for the TU.

TABLE 7

| The syntax elements of filtering window selection at the TU level | |
|---|---|
| | Descriptor |
| transform_tree( x0, y0, tbWidth, tbHeight , treeType, chType ) {<br>  InferTuCbfLuma = 1<br>  if( IntraSubPartitionsSplitType = = ISP_NO_SPLIT && !cu_sbt_flag ) {<br>    if( tbWidth > MaxTbSizeY | | tbHeight > MaxTbSizeY ) {<br>      verSplitFirst = ( tbWidth > MaxTbSizeY && tbWidth > tbHeight ) ? 1 : 0<br>      trafoWidth = verSplitFirst ? ( tbWidth / 2 ) : tbWidth<br>      trafoHeight = !verSplitFirst ? ( tbHeight / 2 ) : tbHeight<br>      transform_tree( x0, y0, trafoWidth, trafoHeight, treeType, chType )<br>      if( verSplitFirst )<br>    transform_tree( x0 + trafoWidth, y0, trafoWidth, trafoHeight, treeType, chType )<br>      else<br>    transform_tree( x0, y0 + trafoHeight, trafoWidth, trafoHeight, treeType, chType )<br>    } else {<br>      transform_unit( x0, y0, tbWidth, tbHeight, treeType, 0, chType )<br>if(chType == CHANNEL_TYPE_LUMA && max(tbWidth, tbHeight)<128 && qp>17 &&(isIntra || (isInter && tu_y_coded_flag[ x0 ][ y0 ]&& min(tbWidth, tbHeight)<32))){<br>        filter_window_index<br>      }<br>    }<br>  } else if( cu_sbt_flag ) {<br>    if( !cu_sbt_horizontal_flag ) {<br>      trafoWidth = tbWidth * SbtNumFourthsTb0 / 4<br>      transform_unit( x0, y0, trafoWidth, tbHeight, treeType , 0, 0 )<br>    if(chType == CHANNEL_TYPE_LUMA && max(trafoWidth, tbHeight)<128 && qp>17 &&(isIntra || (isInter && tu_y_coded_flag[ x0 ][ y0 ]&& min(trafoWidth, tbHeight)<32))){<br>        filter_window_index<br>      }<br>    transform_unit( x0 + trafoWidth, y0, tbWidth − trafoWidth, tbHeight, treeType, 1, 0 )<br>    if(chType == CHANNEL_TYPE_LUMA && max(tbWidth − trafoWidth, tbHeight)<128 && qp>17 &&(isIntra || (isInter && tu_y_coded_flag[ x0+trafoWidth ][ y0 ]&& min(tbWidth − trafoWidth, tbHeight)<32))){<br>        filter_window_index<br>      }<br>    } else {<br>      trafoHeight = tbHeight * SbtNumFourthsTb0 / 4<br>      transform_unit( x0, y0, tbWidth, trafoHeight, treeType , 0, 0 )<br>    if(chType == CHANNEL_TYPE_LUMA && max(tbWidth, trafoHeight)<128 && qp>17 &&(isIntra || (isInter && tu_y_coded_flag[ x0 ][ y0 ]&& min(tbWidth, trafoHeight)<32))){<br>        filter_window_index<br>      }<br>    transform_unit( x0, y0 + trafoHeight, tbWidth, tbHeight − trafoHeight, treeType, 1, 0 )<br>    if(chType == CHANNEL_TYPE_LUMA && max(tbWidth, tbHeight-trafoHeight)<128 && qp>17 &&(isIntra || (isInter && tu_y_coded_flag[ x0 ][ y0+trafoHeight]&& min(tbWidth, tbHeight-trafoHeight)<32))){<br>        filter_window_index<br>      }<br>    }<br>  } else if( IntraSubPartitionsSplitType = = ISP_HOR_SPLIT ) {<br>    trafoHeight = tbHeight / NumIntraSubPartitions<br>    for( partIdx = 0; partIdx < NumIntraSubPartitions; partIdx++ ){<br>  transform_unit( x0, y0 + trafoHeight * partIdx, tbWidth, trafoHeight, treeType, partIdx, 0 )<br>      if(chType == CHANNEL TYPE LUMA && max(tbWidth, | <br><br><br><br><br><br><br><br><br>ae(v)<br><br><br><br><br><br><br>ae(v)<br><br><br><br><br>ae(v)<br><br><br><br><br><br>ae(v)<br><br><br><br><br><br>ae(v) |

TABLE 7-continued

The syntax elements of filtering window selection at the TU level

| | Descriptor |
|---|---|
| trafoHeight)<128 && qp>17 &&(isIntra \|\| (isInter && tu_y_coded_flag[ x0 ][ y0+ trafoHeight * partIdx ]&& min(tbWidth, trafoHeight)<32))){ | |
|     filter_window_index | ae(v) |
|     } | |
|   } | |
| } else if( IntraSubPartitionsSplitType = = ISP_VER_SPLIT ) { | |
|   trafoWidth = tbWidth / NumIntraSubPartitions | |
|   for( partIdx = 0; partIdx < NumIntraSubPartitions; partIdx++ ){ | |
|   transform_unit( x0 + trafoWidth * partIdx, y0, trafoWidth, tbHeight, treeType, partIdx, 0 ) | |
|     if(chType == CHANNEL_TYPE_LUMA && max(trafoWidth, tbHeight)<128 && qp>17 &&(isIntra \|\| (isInter && tu_y_coded_flag[ x0 + trafoWidth * partIdx ][ y0 ]&& min(trafoWidth, tbHeight)<32))){ | |
|     filter_window_index | ae(v) |
|     } | |
|   } | |
|   } | |
| } | |

The following Table 8 provides the syntax elements for filtering window selection at the CU level. The filter_window_index is signaled to indicate which filtering window is used for the CU.

TABLE 8

The syntax elements of filtering window selection at the CU level

| | Descriptor |
|---|---|
| coding_unit( x0, y0, cbWidth, cbHeight, cqtDepth, treeType, modeType ) { | |
|   if( sh_slice_type = = I && ( cbWidth > 64 \| \| cbHeight > 64 ) ) | |
|     modeType = MODE_TYPE_INTRA | |
|   ...... | |
|   if( cu_coded_flag ) { | |
|     if( CuPredMode[ chType ][ x0 ][ y0 ] = = MODE_INTER && sps_sbt_enabled_flag && | |
|       !ciip_flag[ x0 ][ y0 ] && cbWidth <= MaxTbSizeY && cbHeight <= MaxTbSizeY ) { | |
|       allowSbtVerH = cbWidth >= 8 | |
|       allowSbtVerQ = cbWidth >= 16 | |
|       allowSbtHorH = cbHeight >= 8 | |
|       allowSbtHorQ = cbHeight >= 16 | |
|       if( allowSbtVerH \| \| allowSbtHorH ) | |
|         cu_sbt_flag | ae(v) |
|       if( cu_sbt_flag ) { | |
|         if( ( allowSbtVerH \| \| allowSbtHorH ) && ( allowSbt VerQ \| \| allowSbtHorQ ) ) | |
|           cu_sbt_quad_flag | ae(v) |
|         if( ( cu_sbt_quad_flag && allowSbtVerQ && allowSbtHorQ ) \| \| | |
|           ( !cu_sbt_quad_flag && allowSbtVerH && allowSbtHorH ) ) | |
|           cu_sbt_horizontal_flag | ae(v) |
|           cu_sbt_pos_flag | ae(v) |
|       } | |
|     } | |
|     if( sps_act_enabled_flag && CuPredMode[ chType ][ x0 ][ y0 ] != MODE_INTRA && | |
|       treeType = = SINGLE_TREE ) | |
|       cu_act_enabled_flag | ae(v) |
|   LfnstDcOnly = 1 | |
|   LfnstZeroOutSigCoeffFlag = 1 | |
|   MtsDcOnly = 1 | |
|   MtsZeroOutSigCoeffFlag = 1 | |
|   transform_tree( x0, y0, cbWidth, cbHeight, treeType, chType ) | |
|   lfnstWidth = ( treeType = = DUAL_TREE_CHROMA ) ? cbWidth / SubWidthC : | |
|       ( ( IntraSubPartitionsSplitType = = ISP_VER_SPLIT ) ? | |
|         cbWidth / NumIntraSubPartitions : cbWidth ) | |
|   lfnstHeight = (treeType= = DUAL_TREE_CHROMA ) ? cbHeight / SubHeightC : | |
|       ( ( IntraSubPartitionsSplitType = = ISP_HOR_SPLIT) ? | |
|         cbHeight / NumIntraSubPartitions : cbHeight ) | |

TABLE 8-continued

The syntax elements of filtering window selection at the CU level

| | Descriptor |
|---|---|

```
    lfnstNotTsFlag = ( treeType = = DUAL_TREE_CHROMA | |
              !tu_y_coded_flag[ x0 ][ y0 ] | |
              transform_skip_flag[ x0 ][ y0 ][ 0 ] = = 0 ) &&
            ( treeType = = DUAL_TREE_LUMA | |
              ( ( !tu_cb_coded_flag[ x0 ][ y0 ] | |
              transform_skip_flag[ x0 ][ y0 ][ 1 ] = = 0 ) &&
              ( !tu_cr_coded_flag[ x0 ][ y0 ] | |
              transform_skip_flag[ x0 ][ y0 ][ 2 ] = = 0 ) ) )
    if( Min( lfnstWidth, lfnstHeight ) >= 4 && sps_lfnst_enabled_flag = =
1 &&
        CuPredMode[ chType ][ x0 ][ y0 ] = = MODE_INTRA   &&
lfnstNotTsFlag = = 1 &&
        ( treeType = = DUAL_TREE_CHROMA
| | !IntraMipFlag[ x0 ][ y0 ] | |
          Min( lfnstWidth, lfnstHeight ) >= 16 ) &&
        Max( cbWidth, cbHeight ) <= MaxTbSizeY) {
      if( ( IntraSubPartitionsSplitType != ISP_NO_SPLIT | | LfnstDcOnly
= = 0 ) &&
          LfnstZeroOutSigCoeffFlag = = 1 )
        lfnst_idx                                             ae(v)
    }
    if( treeType != DUAL_TREE_CHROMA && lfnst_idx = = 0 &&
        transform_skip_flag[ x0 ][ y0 ][ 0 ] = = 0 && Max( cbWidth,
cbHeight ) <= 32 &&
        IntraSubPartitionsSplitType = = ISP_NO_SPLIT && cu_sbt_flag
= = 0 &&
        MtsZeroOutSigCoeffFlag = = 1 && MtsDcOnly = = 0 ) {
      if( ( ( CuPredMode[ chType ][ x0 ][ y0 ] = = MODE_INTER &&
          sps_explicit_mts_inter_enabled_flag ) | |
          ( CuPredMode[ chType ][ x0 ][ y0 ] = = MODE_INTRA &&
          sps_explicit_mts_intra_enabled_flag ) ) )
        mts_idx                                               ae(v)
    }
  }
  isBIFEnabled = false
  for(tuIdx=0; tuIdx<NumTUInCU;tuIdx++){
if(bilateral_filter_ctb_flag[ x0 >> CtbLog2SizeY ][ y0 >> CtbLog2SizeY ]
&& max(tbWidth, tbHeight)<128 && qp>17 &&(isIntra || (isInter &&
tu_y_coded_flag&& min(tbWidth, tbHeight)<32)) ){
      isBIFEnabled = true
      break
  }
    if(isBIFEnabled &&chType == CHANNEL_TYPE_LUMA&&
bilateral_filter_ctb_flag[ x0 >> CtbLog2SizeY ][ y0 >> CtbLog2SizeY ]){
    side_window_index                                         ae(v)
  }
}
```

The following Table 9 provides the syntax elements of filtering window selection at the CTU level. If bilateral filtering is enabled for the CTU, then the filter_window_index can be signaled to indicate which filtering window is used for the CTU.

TABLE 9

The syntax elements of filtering window selection at the CTU level

| | Descriptor |
|---|---|

```
coding_tree_unit( ) {
 ...
  if( !slice_bilateral_filter_all_ctb_enabled_flag &&
slice_bilateral_filter_enabled_flag )
    bilateral_filter_ctb_flag[ xCtb >> CtbLog2SizeY ][ yCtb >> CtbLog2SizeY    u(1)
]
    if(bilateral_filter_ctb_flag[ xCtb >> CtbLog2SizeY ][ yCtb >> CtbLog2Siz
eY ]){
    filter_window_index                                       ae(v)
  }
```

Consistent with the present disclosure, a fixed-pattern side filtering window can be described with a filter window index as described by the following Table 10. When a fixed-pattern side filtering window is applied in video coding, a syntax element "filter_window_index" can be used to indicate a filtering window type of the fixed-pattern side filtering window.

TABLE 10 fixed-pattern side filtering windows and corresponding filter window indices

| filtering window type | filter window index |
|---|---|
| full_window (F) | 0 |
| upper_window (U) | 1 |
| lower_window (D) | 2 |
| left_window (L) | 3 |
| right_window (R) | 4 |
| northwest_window (NW) | 5 |
| northeast_window (NE) | 6 |
| southwest_window (SW) | 7 |
| southeast_window (SE) | 8 |

Figure 8:
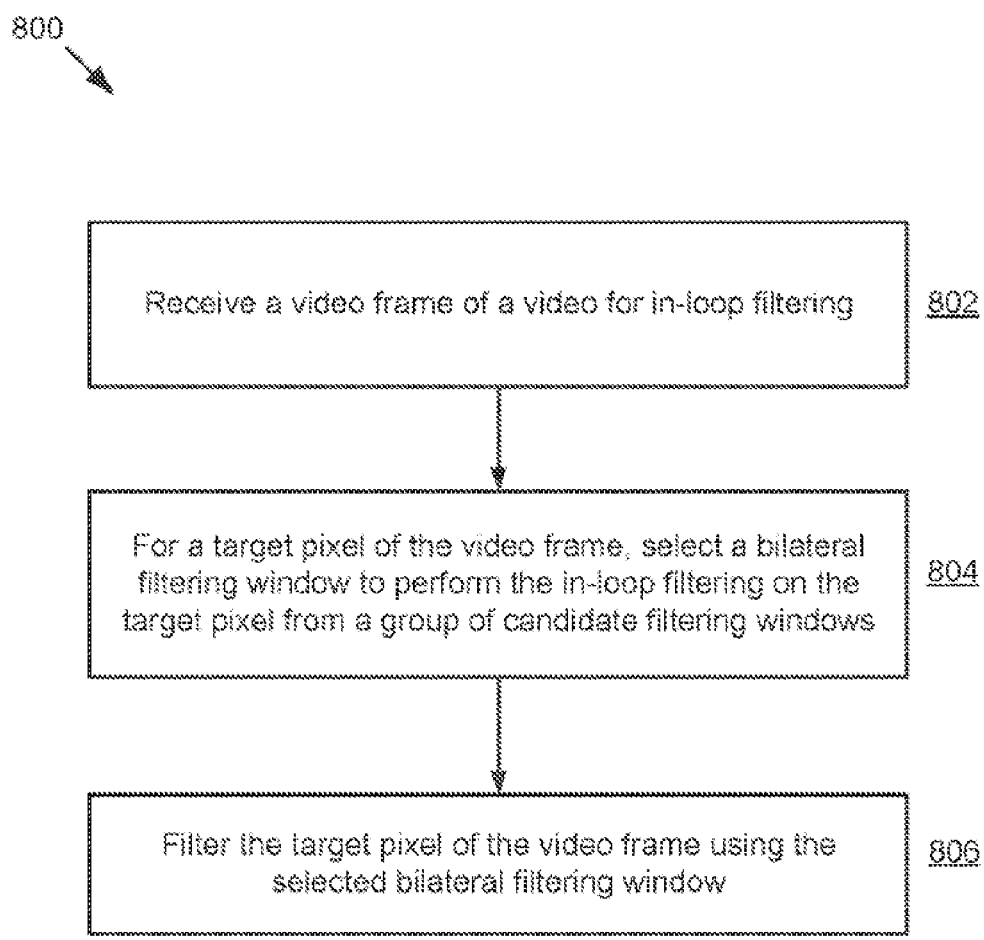
FIG. 8 is a flow chart of an exemplary method for bilateral filtering with side filtering windows in accordance with some implementations of the present disclosure.

FIG. 8 is a flow chart of an exemplary method 800 for bilateral filtering with side filtering windows in accordance with some implementations of the present disclosure. Method 800 may be implemented by a video processor associated with video encoder 20 or video decoder 30, and may include steps 802-804 as described below. Some of the steps may be optional to perform the disclosure provided herein. Further, some of the steps may be performed simultaneously, or in a different order than shown in FIG. 8.

In step 802, the video processor may receive a video frame of a video for in-loop filtering.

In step 804, for a target pixel of the video frame, the video processor may select a bilateral filtering window to perform the in-loop filtering on the target pixel from a group of candidate filtering windows. The group of candidate filtering windows may include a plurality of side filtering windows and a full filtering window.

In step 806, the video processor may filter the target pixel of the video frame using the selected bilateral filtering window.

Figure 9:
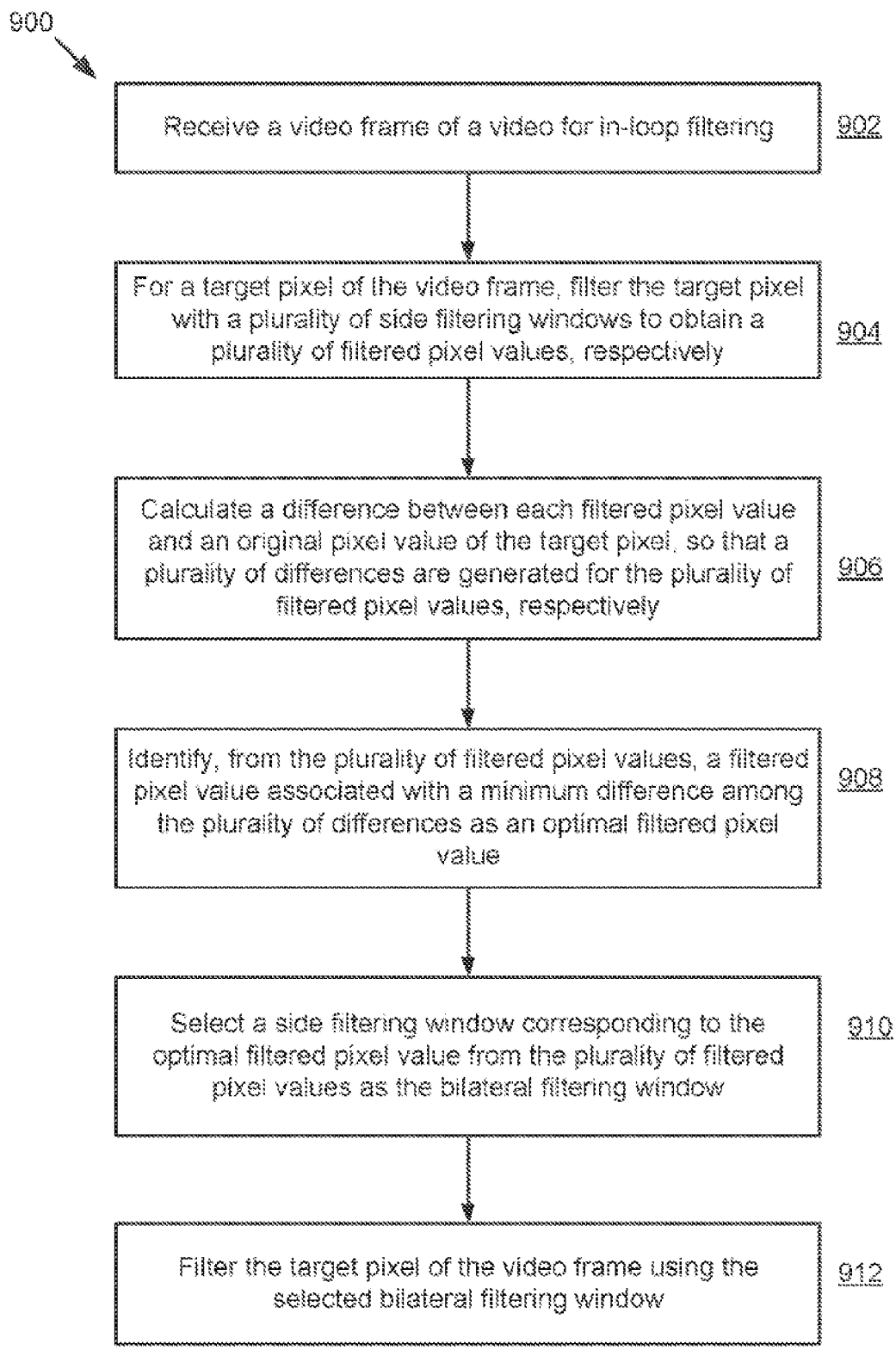
FIG. 9 is a flow chart of a first exemplary implementation of the method for bilateral filtering with side filtering windows of FIG. 8, in accordance with some implementations of the present disclosure.

FIG. 9 is a flow chart of a method 900, which is a first exemplary implementation of method 800 for bilateral filtering with side filtering windows of FIG. 8, in accordance with some implementations of the present disclosure. Method 900 may be implemented by a video processor associated with video encoder 20 or video decoder 30, and may include steps 902-912 as described below. Specifically, steps 904-910 of method 800 may be performed as an exemplary implementation of step 804 of method 800. Some of the steps may be optional to perform the disclosure provided herein. Further, some of the steps may be performed simultaneously, or in a different order than shown in FIG. 9.

In step 902, the video processor may receive a video frame of a video for in-loop filtering.

In step 904, for a target pixel of the video frame, the video processor may filter the target pixel with a plurality of side filtering windows to obtain a plurality of filtered pixel values, respectively. Implementations of step 904 are described above in connection with FIG. 7. For example, step 904 can be performed according to Step 1 in the First Exemplary Implementation above.

In step 906, the video processor may calculate a difference between each filtered pixel value and an original pixel value of the target pixel, so that a plurality of differences are generated for the plurality of filtered pixel values, respectively.

In step 908, the video processor may identify, from the plurality of filtered pixel values, a filtered pixel value associated with a minimum difference among the plurality of differences as an optimal filtered pixel value.

Implementations of steps 906 and 908 are described above in connection with FIG. 7. For example, steps 906 and 908 can be performed according to Step 2 in the First Exemplary Implementation above.

In step 910, the video processor may select a side filtering window corresponding to the optimal filtered pixel value from the plurality of filtered pixel values as the bilateral filtering window.

In step 912, the video processor may filter the target pixel of the video frame using the selected bilateral filtering window.

Implementations of steps 910 and 912 are described above in connection with FIG. 7. For example, steps 910 and 912 can be performed according to the Return step in the First Exemplary Implementation above.

Figure 10:
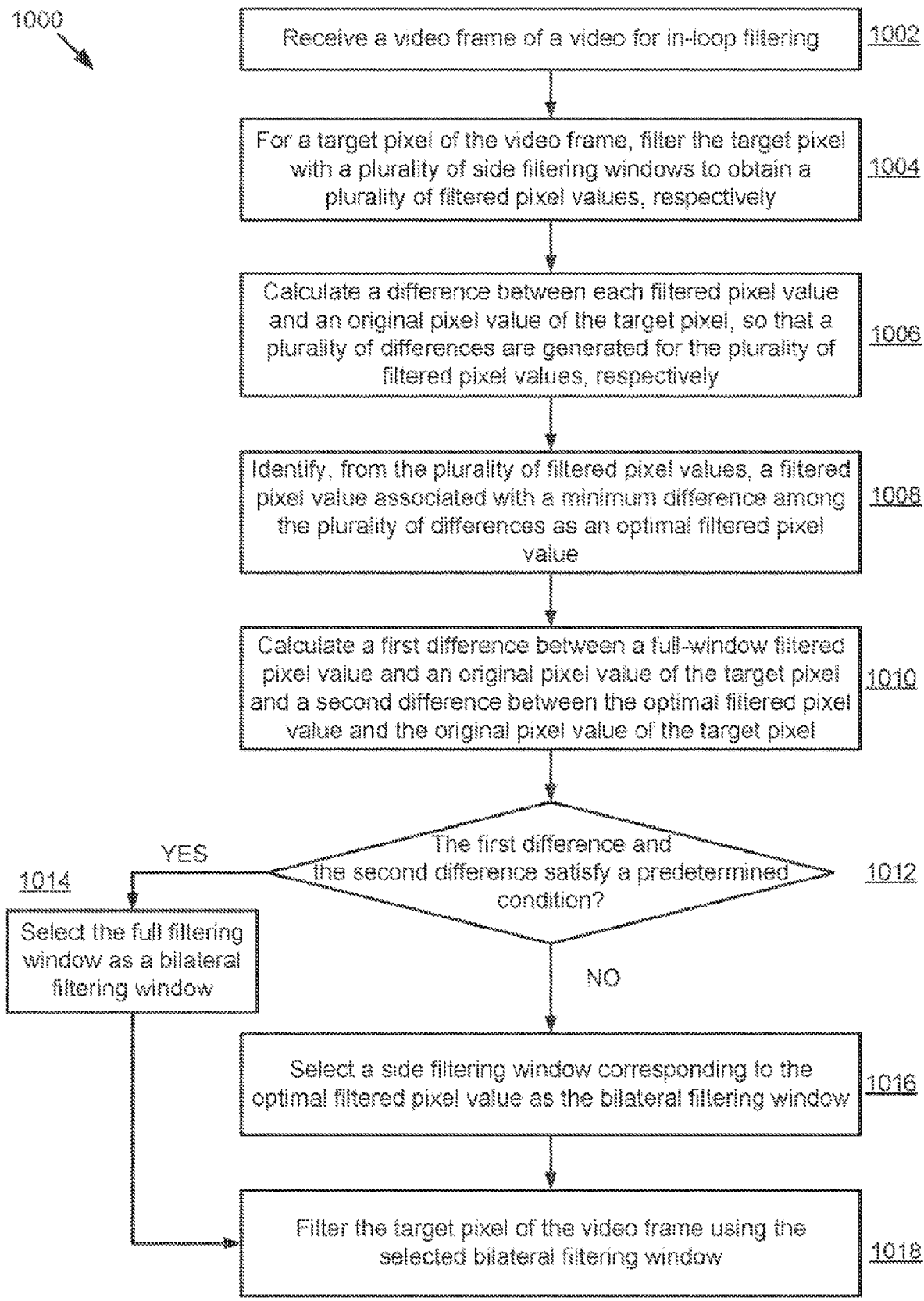
FIG. 10 is a flow chart of a second exemplary implementation of the method for bilateral filtering with side filtering windows of FIG. 8, in accordance with some implementations of the present disclosure.

FIG. 10 is a flow chart of a method 1000, which is a second exemplary implementation of method 800 for bilateral filtering with side filtering windows of FIG. 8, in accordance with some implementations of the present disclosure. Method 1000 may be implemented by a video processor associated with video encoder 20 or video decoder 30, and may include steps 1002-1018 as described below. Specifically, steps 1004-1016 of method 1000 may be performed as an exemplary implementation of step 804 of method 800. Some of the steps may be optional to perform the disclosure provided herein. Further, some of the steps may be performed simultaneously, or in a different order than shown in FIG. 10.

In step 1002, the video processor may receive a video frame of a video for in-loop filtering.

In step 1004, for a target pixel of the video frame, the video processor may filter the target pixel with a plurality of side filtering windows to obtain a plurality of filtered pixel values, respectively. Implementations of step 1004 is described above in connection with FIG. 7. For example, step 1004 can be performed according to Step 1 in the second Exemplary Implementation above.

In step 1006, the video processor may calculate a difference between each filtered pixel value and an original pixel value of the target pixel, so that a plurality of differences are generated for the plurality of filtered pixel values, respectively.

In step 1008, the video processor may identify, from the plurality of filtered pixel values, a filtered pixel value associated with a minimum difference among the plurality of differences as an optimal filtered pixel value.

Implementations of steps 1006 and 1008 are described above in connection with FIG. 7. For example, steps 1006 and 1008 can be performed according to Step 2 in the second Exemplary Implementation above.

In step 1010, the video processor may calculate (a) a first difference between a full-window filtered pixel value and an original pixel value of the target pixel and (b) a second difference between the optimal filtered pixel value and the original pixel value of the target pixel.

In step 1012, the video processor may determine whether the first difference and the second difference satisfy a predetermined condition. If the first difference and the second difference satisfy the predetermined condition, method 1000 may proceed to step 1014. Otherwise, method 1000 may proceed to step 1016. In step 1014, the video processor may select the full filtering window as a bilateral filtering window.

In step 1016, the video processor may select a side filtering window corresponding to the optimal filtered pixel value as the bilateral filtering window.

Implementations of steps 1010-1016 are described above in connection with FIG. 7. For example, steps 1010-1016 can be performed according to Step 3 in the second Exemplary Implementation above.

In step 1018, the video processor may filter the target pixel of the video frame using the selected bilateral filtering window.

Figure 11:
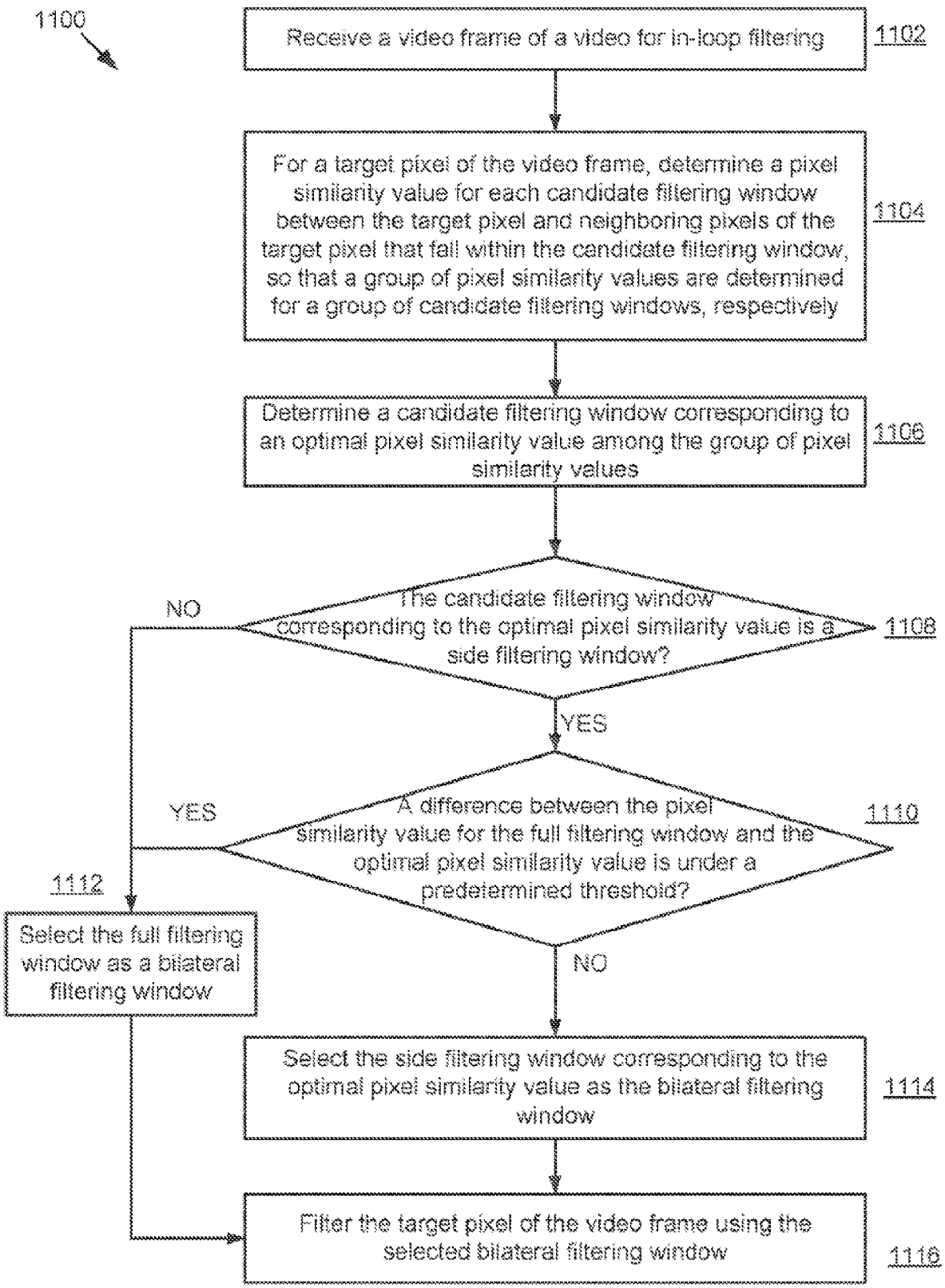
FIG. 11 is a flow chart of a third exemplary implementation of the method for bilateral filtering with side filtering windows of FIG. 8, in accordance with some implementations of the present disclosure.

FIG. 11 is a flow chart of a method 1100, which is a third exemplary implementation of method 800 for bilateral filtering with side filtering windows of FIG. 8, in accordance with some implementations of the present disclosure. Method 1100 may be implemented by a video processor associated with video encoder 20 or video decoder 30, and may include steps 1102-1116 as described below. Specifically, steps 1104-1114 of method 1100 may be performed as an exemplary implementation of step 804 of method 800. Some of the steps may be optional to perform the disclosure provided herein. Further, some of the steps may be performed simultaneously, or in a different order than shown in FIG. 11.

In step 1102, the video processor may receive a video frame of a video for in-loop filtering.

In step 1104, for a target pixel of the video frame, the video processor may determine a pixel similarity value for each candidate filtering window between the target pixel and neighboring pixels of the target pixel that fall within the candidate filtering window. As a result, a group of pixel similarity values are determined for a group of candidate filtering windows, respectively. The group of candidate filtering windows may include a plurality of side filtering windows and a full filtering window. Implementations of step 1104 is described above in connection with FIG. 7. For example, step 1104 can be performed according to Step 1 in the third Exemplary Implementation above.

In step 1106, the video processor may determine a candidate filtering window corresponding to an optimal pixel similarity value among the group of pixel similarity values. Implementations of step 1106 is described above in connection with FIG. 7. For example, step 1106 can be performed according to Step 2 in the third Exemplary Implementation above.

In step 1108, the video processor may determine whether the candidate filtering window corresponding to the optimal pixel similarity value is a side filtering window. If the candidate filtering window corresponding to the optimal pixel similarity value is a side filtering window, method 1100 may proceed to step 1110. Otherwise, method 1100 may proceed to step 1112.

In step 1110, the video processor may determine whether a difference between the pixel similarity value for the full filtering window and the optimal pixel similarity value is under a predetermined threshold. If the difference between the pixel similarity value for the full filtering window and the optimal pixel similarity value is under the predetermined threshold, method 1100 may proceed to step 1112. Otherwise, method 1100 may proceed to step 1114.

In step 1112, the video processor may select the full filtering window as a bilateral filtering window.

In step 1114, the video processor may select the side filtering window corresponding to the optimal pixel similarity value as the bilateral filtering window.

Implementations of steps 1108-1114 are described above in connection with FIG. 7. For example, steps 1108-1114 can be performed according to Step 3 in the third Exemplary Implementation above.

In step 1116, the video processor may filter the target pixel of the video frame using the selected bilateral filtering window.

Figure 12:
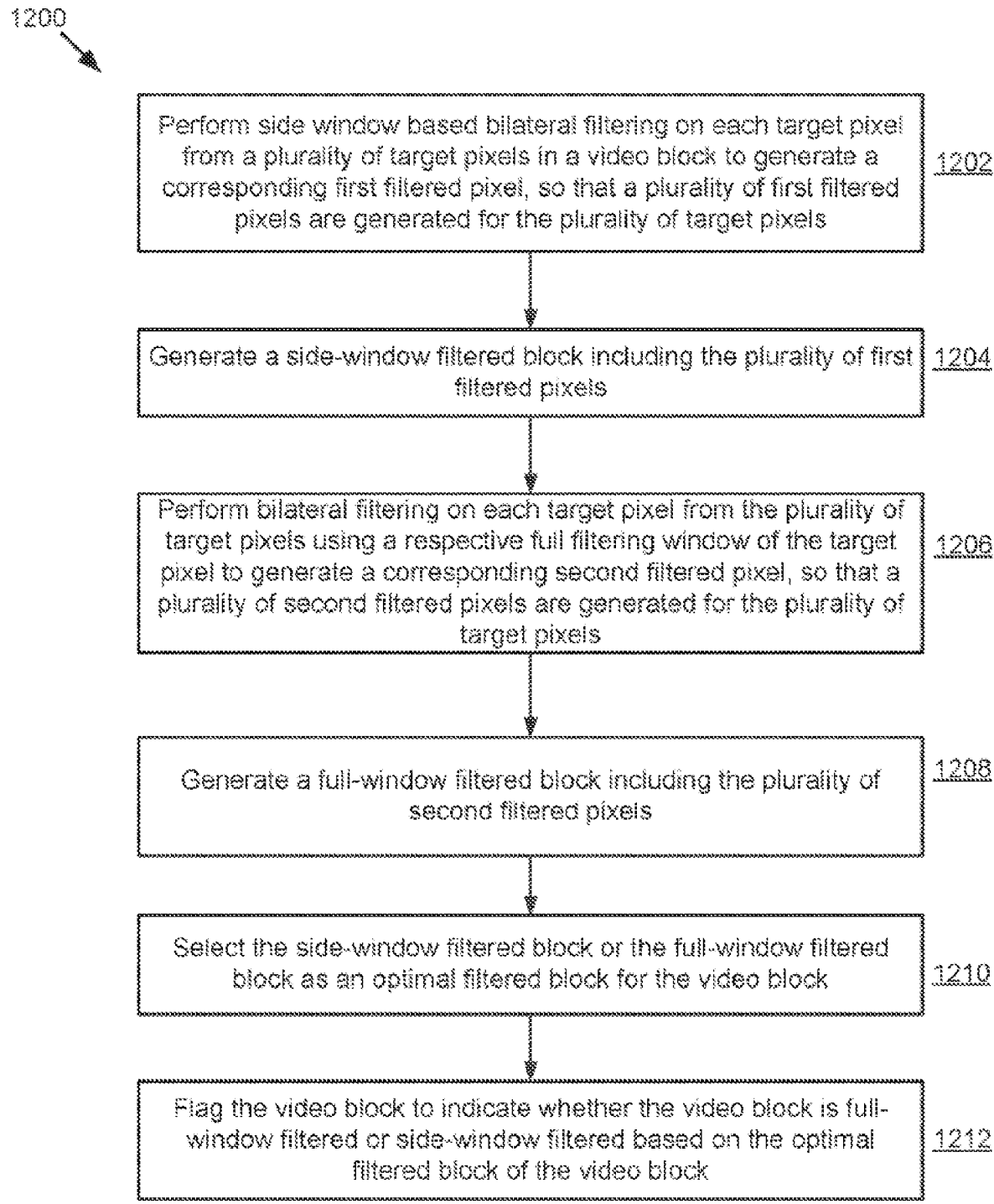
FIG. 12 is a flow chart of an exemplary method for selecting a filtered block for a video block in accordance with some implementations of the present disclosure.

FIG. 12 is a flow chart of an exemplary method 1200 for selecting a filtered block for a video block in accordance with some implementations of the present disclosure. Method 1200 may be implemented by a video processor associated with video encoder 20 or video decoder 30, and may include steps 1202-1212 as described below. Some of the steps may be optional to perform the disclosure provided herein. Further, some of the steps may be performed simultaneously, or in a different order than shown in FIG. 12.

In step 1202, the video processor may perform side window based bilateral filtering on each target pixel from a plurality of target pixels in a video block to generate a corresponding first filtered pixel. As a result, a plurality of first filtered pixels are generated for the plurality of target pixels in the video block. For example, for each target pixel in the video block, the video processor may perform method 800, 900, 1000, or 1100 to filter the target pixel so that a corresponding first filtered pixel is generated for the target pixel.

In step 1204, the video processor may generate a side-window filtered block including the plurality of first filtered pixels.

In step 1206, the video processor may perform bilateral filtering on each target pixel from the plurality of target pixels using a respective full filtering window of the target pixel to generate a corresponding second filtered pixel. As a result, a plurality of second filtered pixels are generated for the plurality of target pixels in the video block.

In step 1208, the video processor may generate a full-window filtered block including the plurality of second filtered pixels.

In step 1210, the video processor may select the side-window filtered block or the full-window filtered block as an optimal filtered block for the video block. For example, the video processor may select the side-window filtered block or the full-window filtered block as the optimal filtered block based on rate distortion optimization.

In step 1212, the video processor may flag the video block to indicate whether the video block is full-window filtered or side-window filtered based on the optimal filtered block of the video block. For example, if the optimal filtered block is the side-window filtered block, the video processor may flag the video block to be side-window filtered. If the optimal filtered block is the full-window filtered block, the video processor may flag the video block to be full-window filtered.

FIG. 13 shows a computing environment 1310 coupled with a user interface 1350, according to some implementations of the present disclosure. The computing environment 1310 can be part of a data processing server. The computing environment 1310 includes a processor 1320, a memory 1330, and an Input/Output (I/O) interface 1340.

The processor 1320 typically controls overall operations of the computing environment 1310, such as the operations associated with display, data acquisition, data communications, and image processing. The processor 1320 may include one or more processors to execute instructions to perform all or some of the steps in the above-described methods. Moreover, the processor 1320 may include one or more modules that facilitate the interaction between the processor 1320 and other components. The processor 1320 may be a Central Processing Unit (CPU), a microprocessor, a single chip machine, a Graphical Processing Unit (GPU), or the like.

The memory 1330 is configured to store various types of data to support the operation of the computing environment 1310. The memory 1330 may include predetermined software 1332. Examples of such data includes instructions for any applications or methods operated on the computing environment 1310, video datasets, image data, etc. The memory 1330 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1340 provides an interface between the processor 1320 and peripheral interface modules, such as a keyboard, a click wheel, buttons, or the like. The buttons may include but are not limited to, a home button, a start scan button, and a stop scan button. The I/O interface 1340 can be coupled with an encoder and decoder.

In some implementations, there is also provided a non-transitory computer-readable storage medium comprising a plurality of programs, for example, in the memory 1330, executable by the processor 1320 in the computing environment 1310, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 1320); and the non-transitory computer-readable storage medium or the memory 1330 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in the memory 1330, executable by the processor 1320 in the computing environment 1310, for performing the above-described methods. For example, the computer program product may include the non-transitory computer-readable storage medium.

In some implementations, the computing environment 1310 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

The invention claimed is:

1. A video processing method with bilateral filtering, comprising:
    receiving, by one or more processors, a video frame of a video for in-loop filtering;
    for a target pixel of the video frame, selecting, by the one or more processors, a bilateral filtering window to perform the in-loop filtering on the target pixel from a group of candidate filtering windows comprising a plurality of side filtering windows and a full filtering window; and
    filtering, by the one or more processors, the target pixel of the video frame using the selected bilateral filtering window,
    wherein selecting the bilateral filtering window for the target pixel comprises:
        filtering the target pixel with the plurality of side filtering windows to obtain a plurality of filtered pixel values, respectively;
        calculating a plurality of differences corresponding to the plurality of filtered pixel values, wherein each difference is between a corresponding filtered pixel value and an original pixel value of the target pixel;
        identifying, from the plurality of filtered pixel values, a filtered pixel value associated with a minimum difference among the plurality of differences as an optimal filtered pixel value; and
        selecting a side filtering window corresponding to the optimal filtered pixel value among the plurality of filtered pixel values as the bilateral filtering window.

2. The video processing method of claim 1, wherein selecting the bilateral filtering window for the target pixel further comprises:
    filtering the target pixel with the full filtering window to obtain a full-window filtered pixel value;
    calculating a first difference between the full-window filtered pixel value and an original pixel value of the target pixel;
    calculating a second difference between the optimal filtered pixel value and the original pixel value of the target pixel; and
    selecting the full filtering window as the bilateral filtering window when the first difference and the second difference satisfy a predetermined condition.

3. The video processing method of claim 2, wherein the predetermined condition is that a third difference between the first difference and the second difference is below a predetermined threshold.

4. The video processing method of claim 1, wherein selecting the bilateral filtering window for the target pixel further comprises:
   determining a group of pixel similarity values for the group of candidate filtering windows, respectively, wherein a pixel similarity value for each candidate filtering window is between the target pixel and neighboring pixels of the target pixel that fall within the candidate filtering window; and
   selecting, from the group of candidate filtering windows, a candidate filtering window corresponding to an optimal pixel similarity value among the group of pixel similarity values as the bilateral filtering window.

5. The video processing method of claim 4, wherein the pixel similarity value for each candidate filtering window is an average of differences determined between a pixel value of the target pixel and pixel values of its neighboring pixels that fall within the candidate filtering window.

6. The video processing method of claim 4, wherein selecting the bilateral filtering window for the target pixel further comprises:
   if the candidate filtering window corresponding to the optimal pixel similarity value is a side filtering window, selecting the bilateral filtering window based on a comparison of the optimal pixel similarity value with a pixel similarity value determined for the full filtering window.

7. The video processing method of claim 6, wherein selecting the bilateral filtering window based on the comparison of the optimal pixel similarity value with the pixel similarity value determined for the full filtering window further comprises:
   selecting the full filtering window as the bilateral filtering window when a difference between the pixel similarity value for the full filtering window and the optimal pixel similarity value is under a predetermined threshold.

8. The video processing method of claim 1, wherein the video frame comprises a plurality of video blocks,
   wherein the video processing method further comprises:
   flagging each video block to indicate whether the video block is full-window filtered or side-window filtered.

9. The video processing method of claim 8, wherein each video block is a transform unit (TU), a coding unit (CU), or a coding tree unit (CTU).

10. The video processing method of claim 1, wherein each side filtering window has a filtering window type indicated by a filtering window index.

11. A video processing apparatus for bilateral filtering, comprising:
   one or more processors; and
   a memory configured to store instructions executable by the one or more processors,
   wherein the one or more processors, upon execution of the instructions, are configured to perform a video processing method comprising:
      receiving a video frame of the video for in-loop filtering;
      for a target pixel of the video frame, selecting a bilateral filtering window to perform the in-loop filtering on the target pixel from a group of candidate filtering windows comprising a plurality of side filtering windows and a full filtering window; and
      filtering the target pixel of the video frame using the selected bilateral filtering window,
   wherein to select the bilateral filtering window for the target pixel, the one or more processors, upon execution of the instructions, are configured to:
      filter the target pixel with the plurality of side filtering windows to obtain a plurality of filtered pixel values, respectively;
      calculate a plurality of differences corresponding to the plurality of filtered pixel values, wherein each difference is between a corresponding filtered pixel value and an original pixel value of the target pixel;
      identify, from the plurality of filtered pixel values, a filtered pixel value associated with a minimum difference among the plurality of differences as an optimal filtered pixel value; and
      select a side filtering window corresponding to the optimal filtered pixel value among the plurality of filtered pixel values as the bilateral filtering window.

12. The video processing apparatus of claim 11, wherein to select the bilateral filtering window for the target pixel, the one or more processors, upon execution of the instructions, are further configured to:
   filter the target pixel with the full filtering window to obtain a full-window filtered pixel value;
   calculate a first difference between the full-window filtered pixel value and an original pixel value of the target pixel;
   calculate a second difference between the optimal filtered pixel value and the original pixel value of the target pixel; and
   select the full filtering window as the bilateral filtering window when a third difference between the first difference and the second difference is below a predetermined threshold.

13. The video processing apparatus of claim 11, wherein to select the bilateral filtering window for the target pixel, the one or more processors, upon execution of the instructions, are further configured to:
   determine a group of pixel similarity values for the group of candidate filtering windows, respectively, wherein a pixel similarity value for each candidate filtering window is between the target pixel and neighboring pixels of the target pixel that fall within the candidate filtering window; and
   select, from the group of candidate filtering windows, a candidate filtering window corresponding to an optimal pixel similarity value among the group of pixel similarity values as the bilateral filtering window.

14. The video processing apparatus of claim 13, wherein to select the bilateral filtering window for the target pixel, the one or more processors, upon execution of the instructions, are further configured to:
   if the candidate filtering window corresponding to the optimal pixel similarity value is a side filtering window, select the full filtering window as the bilateral filtering window when a difference between a pixel similarity value for the full filtering window and the optimal pixel similarity value is under a predetermined threshold.

15. The video processing apparatus of claim 11, wherein the video frame comprises a plurality of video blocks, wherein each video block is a transform unit (TU), a coding unit (CU), or a coding tree unit (CTU),
   wherein the one or more processors, upon execution of the instructions, are further configured to:
   flag each video block to indicate whether the video block is full-window filtered or side-window filtered.

16. A non-transitory computer-readable storage medium storing a bitstream to be decoded by a video processing method or a bitstream generated by the video processing method, the video processing method comprising:
- receiving a video frame of a video for in-loop filtering;
- for a target pixel of the video frame, selecting, according to one or more criteria, a bilateral filtering window to perform the in-loop filtering on the target pixel from a group of candidate filtering windows comprising a plurality of side filtering windows and a full filtering window; and
- filtering the target pixel of the video frame using the selected bilateral filtering window,
- wherein selecting the bilateral filtering window for the target pixel comprises:
  - filtering the target pixel with the plurality of side filtering windows to obtain a plurality of filtered pixel values, respectively;
  - calculating a plurality of differences corresponding to the plurality of filtered pixel values, wherein each difference is between a corresponding filtered pixel value and an original pixel value of the target pixel;
  - identifying, from the plurality of filtered pixel values, a filtered pixel value associated with a minimum difference among the plurality of differences as an optimal filtered pixel value; and
  - selecting a side filtering window corresponding to the optimal filtered pixel value among the plurality of filtered pixel values as the bilateral filtering window.

* * * * *